United States Patent
Nishi et al.

(10) Patent No.: US 8,265,414 B2
(45) Date of Patent: *Sep. 11, 2012

(54) IMAGE PROCESSING DEVICE AND METHOD AND PROGRAM

(75) Inventors: Toru Nishi, Kanagawa (JP); Kazuhiko Ueda, Kanagawa (JP); Mitsuyasu Asano, Tokyo (JP)

(73) Assignee: Sony Corporation, Tokyo (JP)

(*) Notice: Subject to any disclaimer, the term of this patent is extended or adjusted under 35 U.S.C. 154(b) by 794 days.

This patent is subject to a terminal disclaimer.

(21) Appl. No.: 12/238,984

(22) Filed: Sep. 26, 2008

(65) Prior Publication Data

US 2009/0097773 A1  Apr. 16, 2009

(30) Foreign Application Priority Data

Oct. 4, 2007  (JP) .............................. P2007-260841

(51) Int. Cl.
*G06K 9/40* (2006.01)

(52) U.S. Cl. ........ 382/264; 382/265; 382/266; 382/232; 348/241; 348/441; 348/607

(58) Field of Classification Search .................. 382/264, 382/265, 266, 232; 348/241, 441, 607
See application file for complete search history.

(56) References Cited

U.S. PATENT DOCUMENTS

| | | | | |
|---|---|---|---|---|
| 5,752,091 A * | 5/1998 | Kai et al. | ......................... | 396/52 |
| 7,558,675 B2 * | 7/2009 | Sugiura | ............................ | 702/9 |
| 2007/0070221 A1 * | 3/2007 | Nishi et al. | .................... | 348/241 |

FOREIGN PATENT DOCUMENTS

| | | |
|---|---|---|
| JP | 7-59054 | 3/1995 |
| JP | 2000-135268 | 5/2000 |
| JP | 2000-207538 | 7/2000 |
| JP | 2006-081150 | 3/2006 |

OTHER PUBLICATIONS

Office Action for Japanese Application No. 2007260841, issued Oct. 11, 2011.
English-language translation—Patent Abstracts of Japan, Publication No. 2006-081150, published Mar. 23, 2006.
English-language translation—Patent Abstracts of Japan, Publication No. 2000-207538, published Jul. 28, 2000.
English-language translation—Patent Abstracts of Japan, Publication No. 2000-135268, published May 16, 2000.

* cited by examiner

*Primary Examiner* — Mike Rahmjoo
(74) *Attorney, Agent, or Firm* — Finnegan, Henderson, Farabow, Garrett & Dunner, L.L.P.

(57) ABSTRACT

An image processing device to process a moving image, which is shot by a video shooting device, in increments of access units, includes: a correcting unit to correct the access unit to be processed by changing the properties of a low-pass filter which indicates imaging blur according to parameter values showing the properties of imaging blur which occurs at the time that the moving image is shot with the video shooting device, generating an inverse filter having inverse properties as to the low-pass filter, and performing processing to apply the inverse filters as to the access unit to be processed; wherein, with a frequency of which the frequency property of the low-pass filter indicating the imaging blur is zero being zero points, performing processing to apply the inverse filter is forbidden for predetermined frequency components of the frequency components of the access unit to be processed including the zero points.

16 Claims, 14 Drawing Sheets

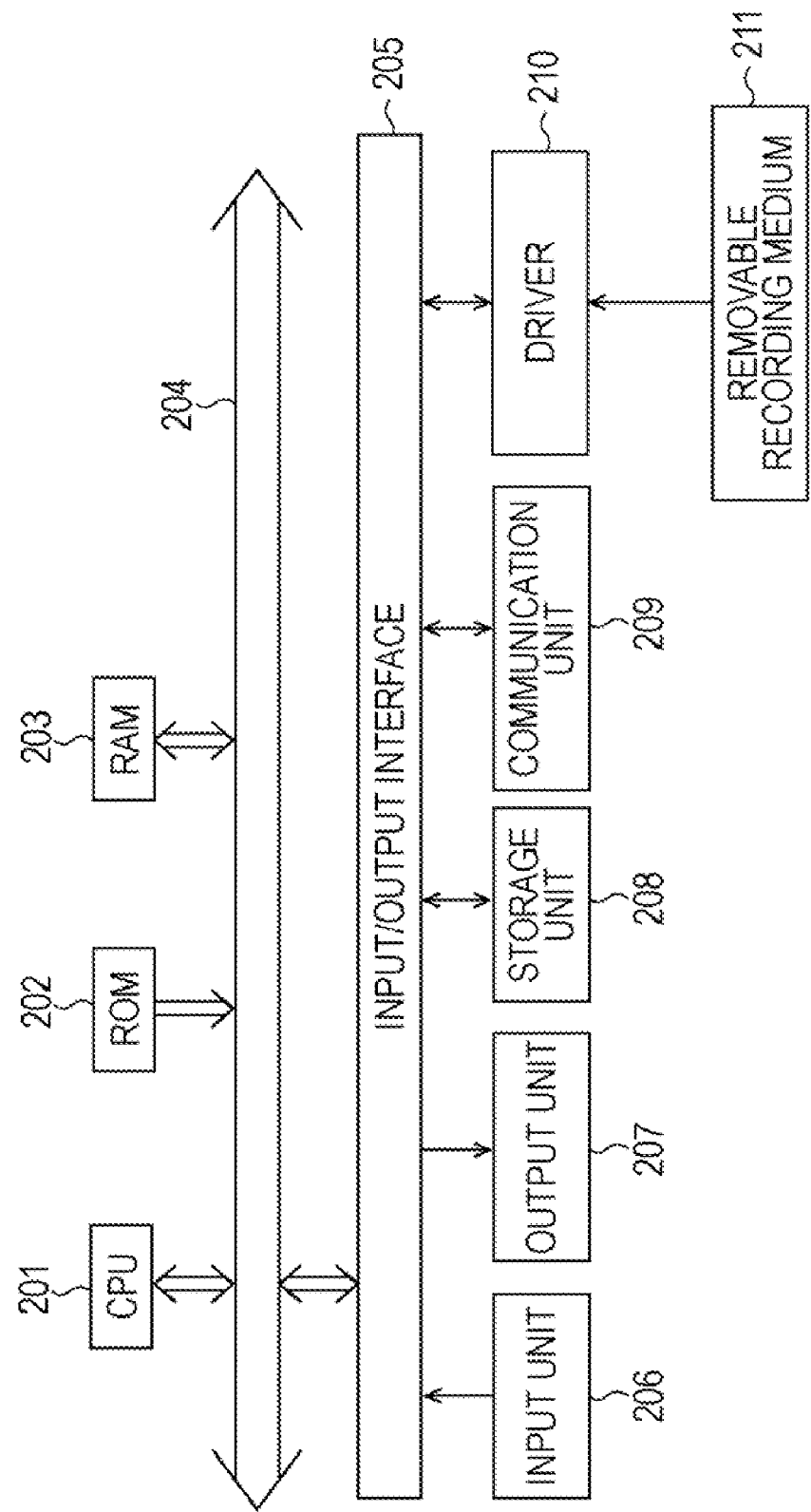

IMAGE PROCESSING DEVICE AND METHOD AND PROGRAM

CROSS REFERENCES TO RELATED APPLICATIONS

The present invention contains subject matter related to Japanese Patent Application JP 2007-260841 filed in the Japanese Patent Office on Oct. 4, 2007, the entire contents of which are incorporated herein by reference.

BACKGROUND OF THE INVENTION

1. Field of the Invention

The present invention relates to an image processing device and method and program, and particularly relates to an image processing device and method and program wherein a video after frame rate conversion can be displayed more clearly by suppressing image deterioration (blurred image) which results from imaging blurring.

2. Description of the Related Art

In recent years, with a video signal conversion device for displaying video (moving image), even in a case that the frame or field frequency between an input side television method and output side television method does not have a constant synchronous relation, a method has been considered to adjust the frame rate, as a method to display without deteriorating the image quality (Japanese Unexamined Patent Application Publication No. 7-59054).

SUMMARY OF THE INVENTION

However, in the case of using a frame rate conversion method according to the related art such as that in Japanese Unexamined Patent Application Publication No. 7-59054 to increase the frame rate, there has not been consideration for motion blurring which occurs at the time of shooting (hereafter will be called imaging blur). Thus, image deterioration (blurred image) resulting from imaging blur has remained without being specifically corrected, and as a result, displaying a clear image on a display device has been difficult.

It has been realized that there is demand for enabling of displaying video after frame rate conversion more clearly by suppressing the image deterioration (blurred image) resulting from the imaging blur.

Note that even with the image processing device invented by the present inventor and disclosed previously in Japanese Unexamined Patent Application Publication No. 2006-081150, video after frame rate conversion can by displayed more clearly by suppressing image deterioration resulting from imaging blur (blurred image). Thus, the present invention enables displaying video after frame rate conversion more clearly by suppressing image deterioration with greater accuracy, while further suppressing image failure occurring from noise emphasis.

According to an embodiment of the present invention, an image processing device configured to process a moving image, which is shot by a predetermined video shooting device, in increments of access units, includes: a correcting unit configured to correct the access unit to be processed by changing the properties of a low-pass filter which indicates imaging blur according to parameter values showing the properties of imaging blur which occurs at the time that the moving image is shot with the video shooting device, generating an inverse filter having inverse properties as to the low-pass filter, and performing processing to apply the inverse filters as to the access unit to be processed; wherein, with a frequency of which the frequency property of the low-pass filter indicating the imaging blur is zero being zero points, performing processing to apply the inverse filter is forbidden for predetermined frequency components of the frequency components of the access unit to be processed including the zero points.

The correcting unit may further include: a low-pass filter property converting unit configured to convert the properties of a low-pass filter indicating the imaging blur into properties according to one or more the parameter values detected by the detecting unit, and output as a spatial region signal, for the access unit to be processed; a frequency converting unit configured to convert the low-pass filter generated as a spatial region signal into a first signal of a frequency region with the low-pass filter property converting unit, and output; a signal generating unit configured to generate, based on the first signal output from the frequency converting unit, a second signal for a frequency region, having frequency properties corresponding to the inverse filter with a first frequency band not including the zero points, and having frequency properties with amplitude thereof below a predetermined value with a second frequency band including the zero points; a frequency inverse conversion unit configured to convert the second signal of the frequency region generated with the signal generating unit into a third signal, and outputting the third signal as a filter; and a filtering unit configured to correct the access unit to be processed by applying the filter output from the frequency inverse conversion unit to the access unit to be processed.

The signal generating unit may further include: an inverse signal generating unit configured to generate the inverse signal having frequency properties wherein all frequency bands correspond to the inverse filter, based on the first signal; a multiplying unit configured to compute the square of the first signal in the frequency region and output the signal obtained as a result thereof; a subtracting unit configured to subtract the output signal of the multiplying unit from the first signal in the frequency region and output the signal obtained as a result thereof; an adding unit configured to add the output signal of the subtracting unit as to the first signal in the frequency region and output the signal obtained as a result thereof as an adjusted signal; and an adjusting unit configured to generate and output, as the second signal, a signal having frequency properties of the inverse signal generated by the inverse signal generating unit at the first frequency band not including the zero points, and having frequency properties of the adjusted signal output from the adding unit at the second frequency band including the zero points.

The value of the parameters indicating the properties of the imaging blur may be respective moving vectors in at least one pixel of the pixels making up the access unit to be processed, for each of the plurality of access units making up the moving images.

An image processing method and program according to an embodiment of the present invention correspond to the image processing device according to the above configuration.

With the image processing device and method and program according to an embodiment of the present invention, a moving image shot with a predetermined video shooting device is process as follows in increments of access units. That is to say, according to the values of the parameters indicating the imaging blur properties which occur when the moving image is shot with the video shooting device, the properties of a low-pass filter indicating the imaging blur is changed, an inverse filter having inverse properties as to the low-pass filter is generated, and processing to apply the inverse filter as to the access units to be processed is performed, whereby the access unit to be processed is corrected. In the event of such correction, with a frequency of which the frequency property of the low-pass filter indicating the imaging blur is zero being zero points, performing processing to apply the inverse filter is forbidden for predetermined frequency components of the frequency components of the access unit to be processed including the zero points.

As described above, according to the present invention, image deterioration resulting from imaging blur (blurred image) can be suppressed. In particular, a moving image after frame rate conversion can be displayed more clearly by further suppressing image failure occurring from noise emphasis, while further suppressing image deterioration resulting from imaging blur (blurred image).

BRIEF DESCRIPTION OF THE DRAWINGS

FIG. 15 is a block diagram illustrating an example of all or a portion of hardware configuration of the image processing device to which the present invention is applied.

DESCRIPTION OF THE PREFERRED EMBODIMENTS

Before describing an embodiment of the present invention, the correspondence between the features of the claims and the specific elements disclosed in an embodiment of the present invention will be discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment are described in the claims. That is, the description does not deny the existence of aspects of the present invention that are described in the embodiment but not claimed in the invention of this application, i.e., the existence of aspects of the present invention that in future may be claimed by a divisional application, or that may be additionally claimed through amendments.

Figure 4:
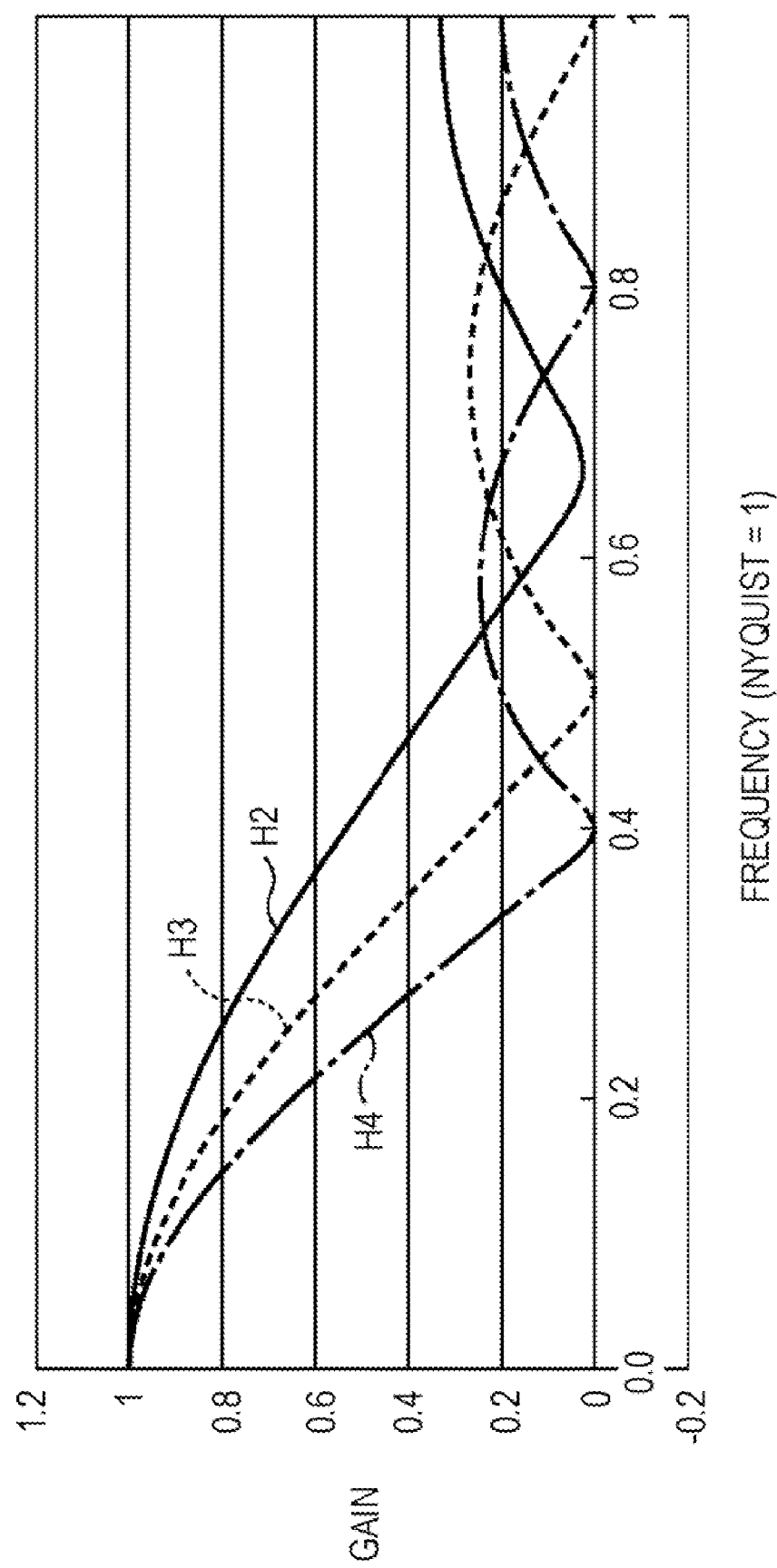
FIG. 4 is a diagram illustrating frequency properties of image blurring according to a movement vector (moving speed)

An image processing device according to an embodiment of the present invention is an image processing device configured to process a moving image, which is shot by a predetermined video shooting device, in increments of access units, including: a correcting unit (e.g. the imaging blur suppressing processing unit 13 in FIG. 5) configured to correct the access unit to be processed by changing the properties of a low-pass filter which indicates imaging blur according to parameter values showing the properties of imaging blur which occurs at the time that the moving image is shot with the video shooting device (e.g. as shown in FIG. 4, in the case that the parameter value is moving speed, the properties are changed as in the curves H2, H3, and H4 according to the moving speed of 2, 3, 4 [pixels/frames] respectively), generating an inverse filter having inverse properties as to the low-pass filter, and performing processing of the inverse filters as to the access unit to be processed; wherein, with a frequency of which the frequency property of the low-pass filter indicating the imaging blur is zero being zero points (e.g. the respective frequency for the curves H2, H3, H4 in FIG. 4 the gain of which is 0), performing processing to apply the inverse filter is forbidden for predetermined frequency components of the frequency components of the access unit to be processed including the zero points.

Figure 5:
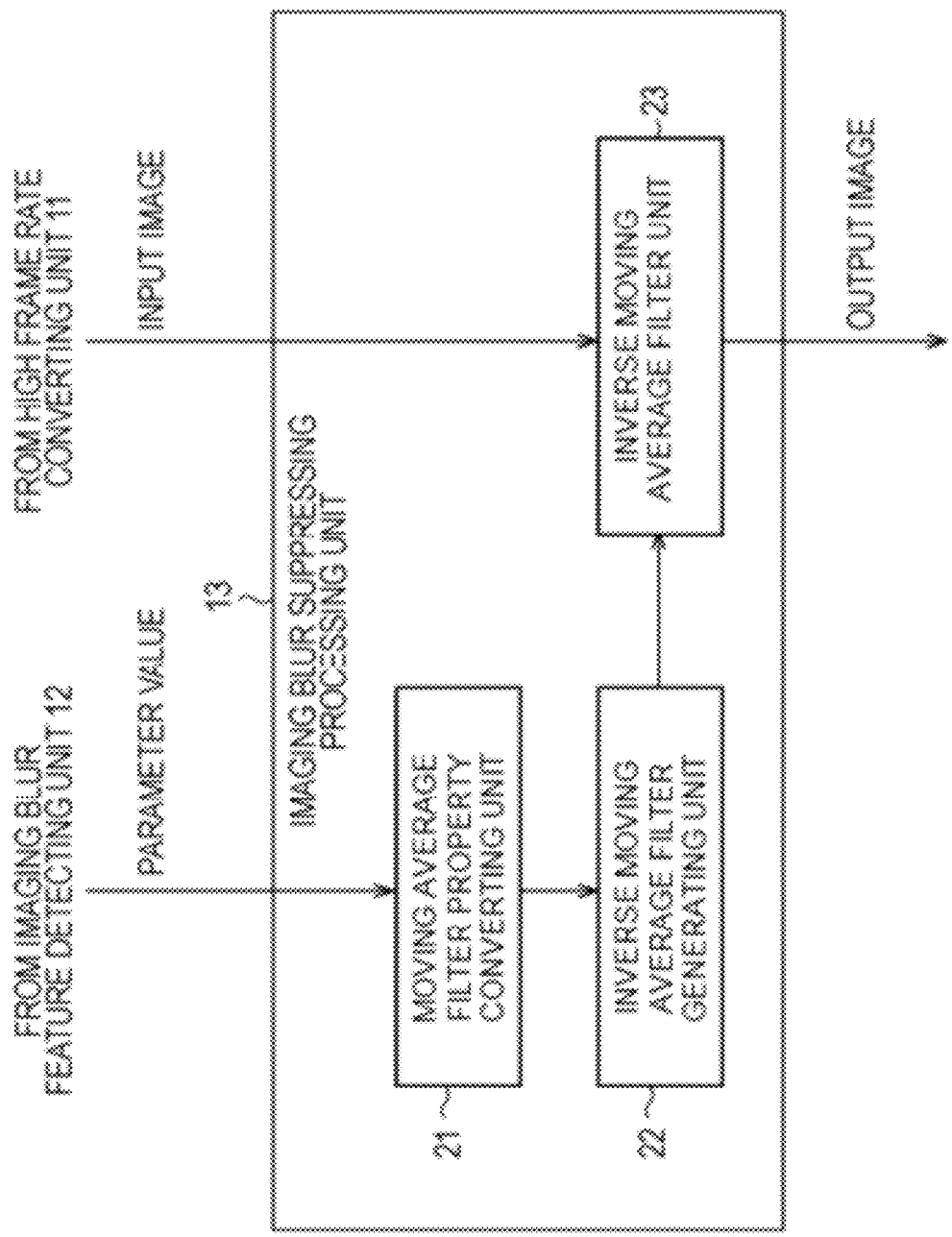
FIG. 5 is a block diagram illustrating an example of a functional configuration of an image blur suppressing processing unit in the image processing device in FIG. 1.

The correcting unit may include: a low-pass filter property converting unit (e.g. a movement average filter property converting unit 21 in FIG. 5) configured to convert the properties of a low-pass filter indicating the imaging blur into properties according to one or more parameter values detected by the detecting unit, and output as a spatial region signal, for the access unit to be processed; a frequency converting unit (e.g. a frequency converting unit 31 of the reverse movement average filter generating unit 22 in FIG. 5) configured to convert the low-pass filter generated as a spatial region signal into a first signal (e.g. signal T1 in FIG. 8) of a frequency region with the low-pass filter property converting unit, and output; a signal generating unit (e.g. adjusted inverse function generating unit 41 in FIG. 8 of the reverse movement average filter generating unit 22 in FIG. 5) configured to generate, based on the first signal output from the frequency converting unit, a second signal (e.g. signal U5 in FIG. 8) for a frequency region, having frequency properties corresponding to the inverse filter with a first frequency band not including the zero points, and having frequency properties with amplitude thereof below a predetermined value with a second frequency band including the zero points; a frequency inverse conversion unit (e.g. a frequency inverse conversion unit 33 in FIG. 8 of the reverse movement average filter generating unit 22 in FIG. 5) configured to convert the second signal of the frequency region generated with the signal generating unit into a third signal (e.g. signal T3 in FIG. 8), and outputting the third signal as a filter; and a filtering unit (e.g. an reverse movement average filter unit 23 in FIG. 5) configured to correct the access unit to be processed by applying the filter output from the frequency inverse conversion unit to the access unit to be processed.

The signal generating unit may include: an inverse signal generating unit (e.g. an inverse function generating unit 51 in FIG. 7) configured to generate the inverse signal (e.g. signal U1 of the waveform in FIG. 9) having frequency properties wherein all frequency bands correspond to the inverse filter, based on the first signal; a multiplying unit (e.g. a multiplying unit 52 in FIG. 7) configured to compute the square of the first signal in the frequency region and output the signal (e.g. signal U2 of the waveform in FIG. 9) obtained as a result thereof; a subtracting unit (e.g. subtracting unit 53 in FIG. 7) configured to subtract the output signal (e.g. signal U3 of the waveform in FIG. 9) of the multiplying unit from the first signal in the frequency region and output the signal obtained as a result thereof; an adding unit (e.g. adding unit 54 in FIG. 7) configured to add the output signal of the subtracting unit as to the first signal in the frequency region and output the signal obtained as a result thereof as an adjusted signal (e.g. signal U4 of the waveform in FIG. 9); and an adjusting unit (e.g. clip unit 55 in FIG. 7) configured to generate and output, as the second signal, a signal having frequency properties of the inverse signal generated by the inverse signal generating unit at the first frequency band (e.g. frequency band F1, F3 in FIG. 9) not including the zero points, and having frequency properties of the adjusted signal output from the adding unit at the second frequency band (e.g. frequency band F2, F4 in FIG. 9) including the zero points.

The information processing method and program according to an embodiment of the present invention are a method and program corresponding to the above-described image processing method according to an embodiment of the present invention. Details will be described later, but for example, recording is performed on a removable recording medium 211 or a recording medium such as a hard disk included in a storage unit 208 as in FIG. 15, and is executed with a computer in the configuration shown in FIG. 15. Additionally, a recording medium having recorded the program according to an embodiment of the present invention as described is also included as an embodiment of the present invention.

The image processing device of the present invention as described above can be used as an entire television system or a component thereof. A television system indicates a system made up of one or more AV (audio and visual) devices including a television broadcast receiving device.

Figure 1:
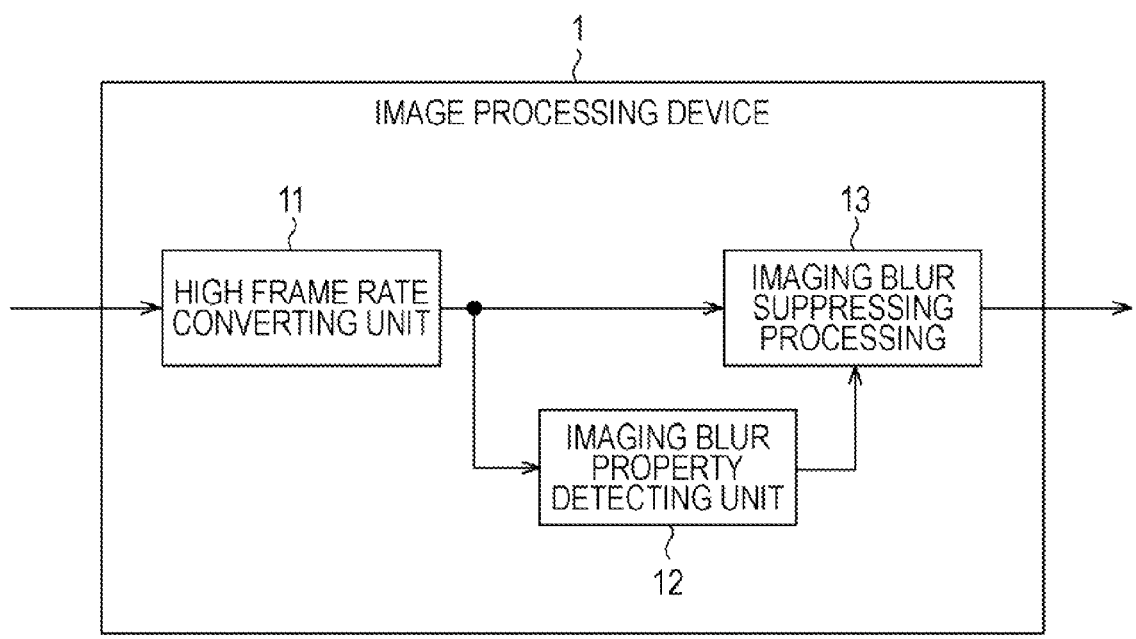
FIG. 1 is a block diagram illustrating an example of a functional configuration of an image processing device to which the present invention has been applied.

Next, embodiments of the present invention will be described with reference to the drawings. FIG. 1 shows an example of a functional configuration of an image processing device to which the present invention is applied.

An image processing device 1 executes various types of image processing as to moving image data in increments of access units. The term "access unit" refers to increments of moving images such as frames and fields, and specifically to all or a portion of each frame (still image) making up a moving image, for example. However, hereafter for simplification, let us say that the image processing device 1 executes various types of image processing as to moving image data in increments of frames.

The image processing device 1 is made up of a high frame rate converting unit 11, imaging blur property detecting unit 12, and imaging blur suppressing processing 13, as shown in FIG. 1.

A moving image signal of a television broadcasting signal and so forth is input in the high frame rate converting unit 11 as moving image data in frame increments, for example.

Note that hereafter, in the case that a moving image and the moving image data corresponding thereto do not have to be individually distinguished, these will be collectively referred to simply as "moving images". Similarly, in the case that a frame and the frame data corresponding thereto do not have to be individually distinguished, these will be collectively referred to "simply" as frames.

In the case that a moving image of a first frame rate is input, the high frame rate converting unit 11 performs high frame rate converting processing as to such moving image, and supplies the moving image of a second frame rate at a higher frame rate than that of the first frame rate obtained as a result thereof to the imaging blur property detecting unit 12 and the imaging blur suppressing processing 13.

High frame rate converting processing is processing executed in the case that the first frame rate at the time of input is lower than the second frame rate at the time of output (display), and indicates processing to convert the first frame rate into a second frame rate higher than the first frame rate, by creating new frames and inserting each between the respective frames making up the moving image at the time of input.

Note that the first frame rate indicates the frame rate of a moving image at the point in time of input in the high frame rate converting unit 11. Accordingly, the first frame rate can become an arbitrary frame rate, but here let us say that the first frame rate is the frame rate when the moving image is shot by an unshown video shooting device, i.e. is an imaging frame rate, for example.

The imaging blur property detecting unit 12 detects parameter values indicating imaging blur properties for each of the frames making up a moving image supplied from the high frame rate converting unit 11. The detection results from the imaging blur property detecting unit 12, i.e. the parameter values showing imaging blur properties, are supplied to the imaging blur suppressing processing unit 13.

Note that the parameters indicating imaging blur properties are not particularly restricted but various parameters can be employed. However, specific examples of parameters indicating imaging blur properties will be described later.

Also, the number of detected parameter values showing imaging blur properties within one frame is not particularly restricted. For example, only one parameter value showing imaging blur properties may be detected, or parameter values showing imaging blur properties may be detected individually one at a time. Alternatively, one of the frames may be divided into several blocks, and parameter values showing imaging blur properties may be detected individually one at a time for each divided block.

The imaging blur suppressing processing unit 13 corrects each pixel value making up the frames to be processed, based on values corresponding to the frames to be processed of the parameter values detected with the imaging blur property detecting unit 12, for each of the frames making up the moving image supplied from the high frame rate converting unit 11. That is to say, the imaging blur suppressing processing unit 13 corrects each pixel value of the frames to be processed so that the imaging blur is suppressed, according to the imaging blur properties (parameter value) of the frames to be processed.

Thus, a moving image that has imaging blur suppressed by each pixel value of each frame being corrected, and a moving image that is converted to the second frame rate which is higher than the first frame rate at the time of input, is output externally from the image processing device 1 from the imaging blur suppressing processing unit 13.

Note that in the example of FIG. 1, the set of the imaging blur property detecting unit 12 and imaging blur suppressing processing unit 13 is combined with the high frame rate converting unit 11, but of course, these may be used as a set by itself, or may be used in combination with other unshown blocks (other image processing units performing predetermined image processing).

That is to say, the advantage of suppressing imaging blur can be realized with only the set of the imaging blur property detecting unit 12 and imaging blur suppressing processing unit 13. However, in order for this advantage to be more significant, combining the imaging blur property detecting unit 12 and imaging blur suppressing processing unit 13 with the high frame rate converting unit 11 as described above is favorable. The reason thereof will be described below.

Blurring that is recognized by a person in the event that the moving image displayed on an unshown display device is formed as an image on the retina of the person is blurring which is combining a hold blur from the eye of the person following a moving object included in the moving image and the above-described imaging blur which is added at the time of shooting of the moving image.

The imaging blur property here is shown as a low-pass filter, which will be described later with reference to FIG. 4 and so forth. That is to say, the image signal after imaging blur is a signal equivalent to a signal which has a low-pass filter applied to the image signal before imaging blur (an ideal image signal). Accordingly, the frequency property of the image signal after imaging blur drops as compared to the image signal before imaging blur. That is to say, the gain of the image signal after imaging blur generally drops as the frequency increases, as compared to the image signal before imaging blur.

The property of the hold blur here is also shown as a low-pass filter similar to the imaging blur property. That is to say, the image signal after the hold blur is a signal equivalent to the signal which has the low-pass filter applied to the image signal before the hold blur (image signal after imaging blur). Accordingly, frequency property of the image signal after the hold blur drops as compared to the image signal before the hold blur. That is to say, the gain of the image signal after the hold blur generally drops as the frequency increases, as compared to the image signal before the hold blur. However, the hold blur occurs only when the display device is a fixed image (hold) display device.

Accordingly, by performing high frame rate converting processing as to the image signal after imaging blur wherein the frequency property has already dropped because of imaging blur, suppressing the hold blur can be enabled. However, even if such high frame rate converting processing is performed, the imaging blur deterioration does not change, and the advantage of suppressing the blurring on a human retina is halved in the end. This will be described with reference to FIG. 2.

Figure 2:
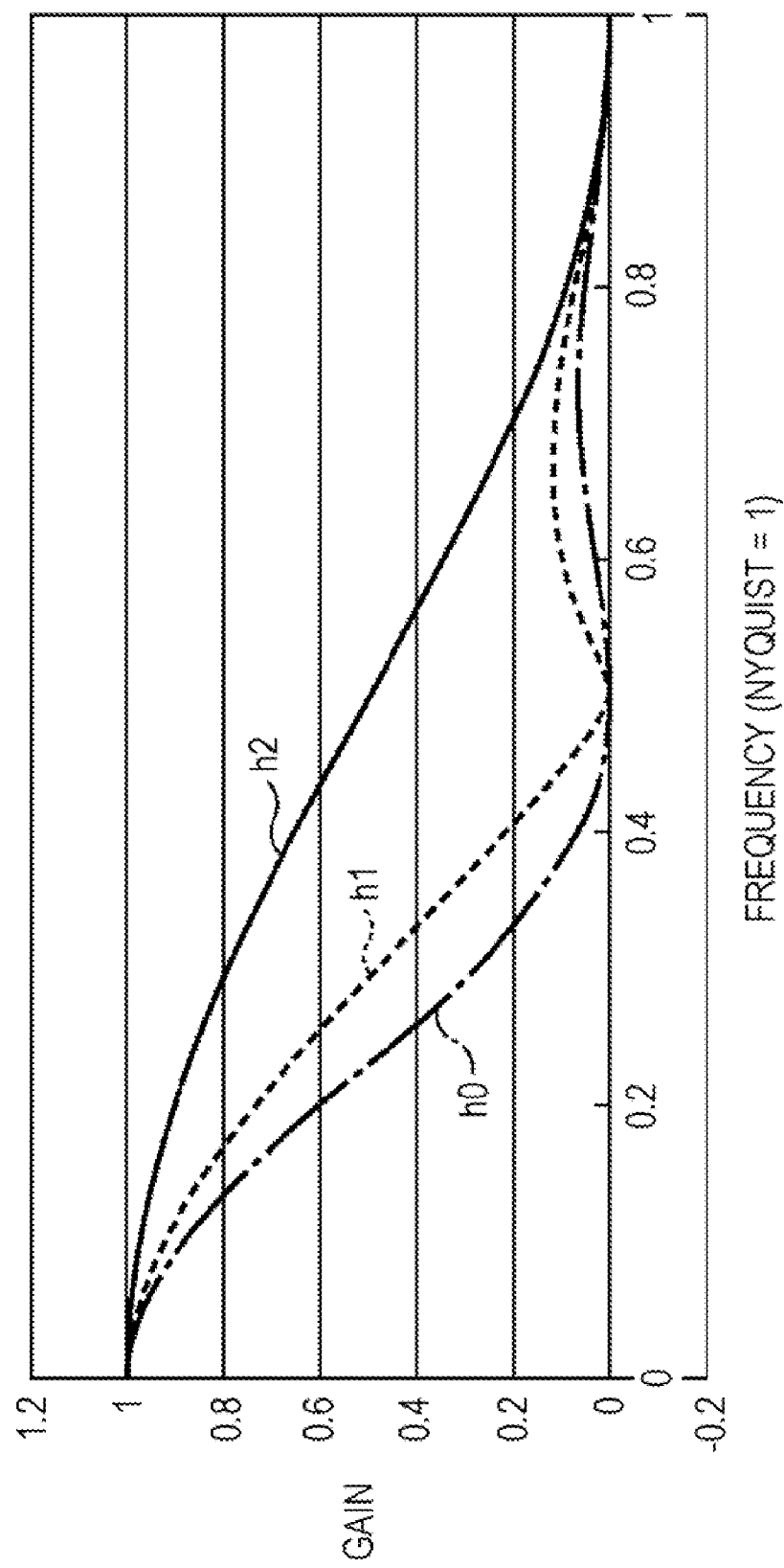
FIG. 2 is a diagram illustrating frequency properties of blurring of an image formed on a human retina.

FIG. 2 shows the frequency properties of the image blurring formed on the human retina at the time that an actual object moving at a moving speed 4 [pixels/frame] is shot within the shooting range of the video shooting device (hereafter called camera). In FIG. 2, the horizontal axis shows frequency and the vertical axis shows the respective gain. However, the various values of the horizontal axis shows the relative value in the case that a Nyquist frequency is 1.

In FIG. 2, the curve h0 shown with a dotted-broken line shows the frequency property of image blurring formed on the human retina in the case that processing to improve the blurring (includes imaging blur and hold blur) is not performed in particular. That is to say, in the case that the moving image input in the image processing device 1 in the example in FIG. 1 is supplied to and displayed on the display device without change instead of being input temporarily in the image processing device 1 (without being processed), the frequency property of the image blurring formed on the retina when the person views the moving image is the curve h0.

Conversely, if the display speed is doubled with the high frame rate converting processing for example, only the hold blur is improved, and as a result, the frequency property of the image blurring formed on the human retina becomes the curve h1 shown with a dotted line in the diagram. That is to say, in the case that the moving image input in the image processing device 1 in FIG. 1 is subjected to high frame rate converting processing with the high frame rate converting unit 11, and thereafter supplied to and displayed on the display device without being temporarily input in the imaging blur suppressing processing unit 13 (without the imaging blur being improved), the frequency property of the image blurring formed on the retina when the person views the moving image is the curve h1.

Also, for example, upon the display speed being doubled with the high frame rate converting processing (hold blur is improved), and the degree of imaging blur being improved by half, the frequency property of the imaging blur formed on a human retina becomes the curve h2 shown in the diagram as a solid line. That is to say, in the case that the moving image input in the image processing device 1 in FIG. 1 is subjected to high frame rate converting processing with the high frame rate converting unit 11, and further supplied to and displayed on the display device upon the imaging blur being suppressed with the imaging blur suppressing processing unit 13, the frequency property of the image blurring formed on the retina when the person views the moving image is the curve h2.

In comparing the curve h1 and curve h2, by only improving the hold blur with the high frame rate converting processing, improvement of the blur property on a human retina is insufficient, and the necessity for further improvements regarding imaging blur becomes apparent. However, as described above, with a method according to the related art, the necessity for improvement to imaging blur is not particularly considered, and high frame rate converting processing has been simply performed.

Thus, with the image processing device of the present invention realized as the embodiment in FIG. 1, other than the high frame rate converting unit 11, the imaging blur property detecting unit 12 and imaging blur suppressing processing unit 13 are provided so as to improve imaging blur, i.e. to improve the blur property on a human retina from the curve h0 to the curve h2 in FIG. 2.

That is to say, the imaging blur suppressing processing unit 13 suppresses image deterioration resulting from imaging blur on the frame after high frame rate conversion, by correcting each pixel value of the frames to be processed, based on the values corresponding to the frames to be processed of the parameter values showing the imaging blur properties detected with the imaging blur property detecting unit 12. That is to say, by supplying the image signal output from the image processing device of the present invention such as the image processing device 1 to an unshown display device, the display device can display a clear video having suppressed image deterioration, as video corresponding to the image signal thereof.

Thus, it is desirable to combine the set of the imaging blur property detecting unit 12 and the imaging blur suppressing processing unit 13 with the high frame rate converting unit 11.

Next, image processing of the image processing device having the functional configuration of FIG. 1 will be described with reference to the flowchart in FIG. 3.

In step S1, the high frame rate converting unit 11 inputs a moving image with the first frame rate.

In step S2, the high frame rate converting unit 11 converts the moving image frame rate to a second frame rate which is higher than the first frame rate.

Upon the moving image converted from the first frame rate to the second frame rate being supplied from the high frame rate converting unit 11 to the imaging blur detecting unit 12 and imaging blur suppressing processing unit 13, the processing is advanced to step S3.

In step S3, the imaging blur property detecting unit 12 detects one or more parameter values indicating imaging blur properties from each of the frames making up the moving image.

Upon the one or more parameters indicating imaging blur properties for each of the frames making up the moving image being supplied from the imaging blur property detecting unit 12 to the imaging blur suppressing processing unit 13, the processing is advanced to step S4.

In step S4, the imaging blur suppressing processing unit 13 corrects each pixel value of the frames to be processed for each frame making up the moving image supplied from the high frame rate converting unit 11, based on the one or more values corresponding to the frames to be processed of the parameter values detected with an imaging blur detecting unit 12.

In step S5, the imaging blur suppressing processing unit 13 outputs the moving image of which the pixel values for each frame have been corrected and which has been modified from the first frame rate to the second frame rate. Thus, the image processing in FIG. 3 is ended.

Note that with the above-described description, to simplify the description, a moving image has been the processing increment for the processing for each step of steps S1 through S5. However, in reality, in many cases a frame is the processing increment.

Figure 3:
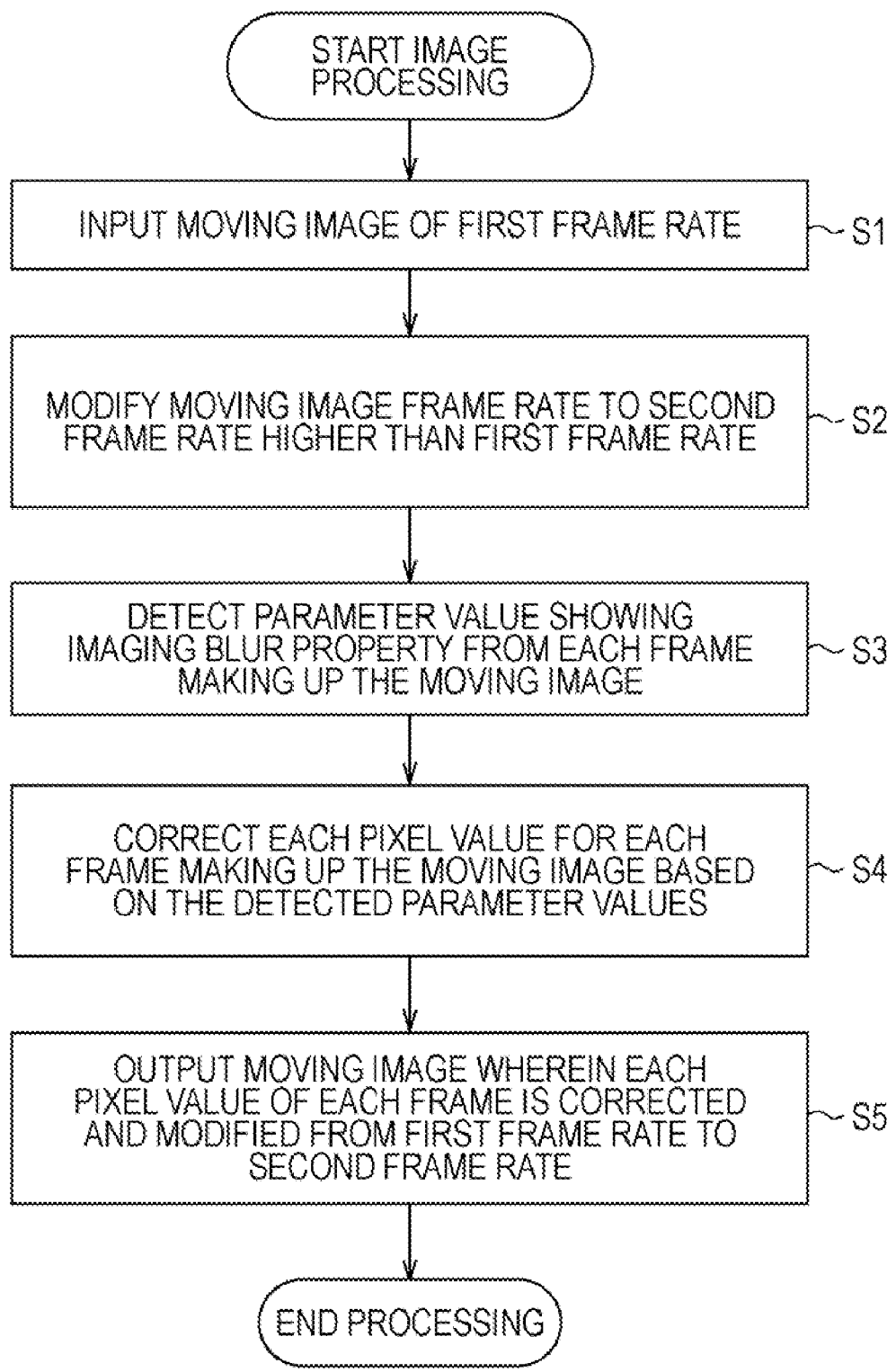
FIG. 3 is a flowchart describing image processing executed by the image processing device in FIG. 1.

With the image processing in FIG. 3, the processing increment for each step being a moving image is equivalent to the advancement conditions from the processing step in steps S1 through S5 to the next step being a condition wherein the processing for the steps to be processed is performed as to the entire moving image.

Conversely, with the image processing in FIG. 3, the processing increment for each step being a frame is equivalent to the advancement conditions from the processing step in steps S1 through S5 to the next step being a condition wherein the processing for the steps to be processed is performed as to one entire frame. In other words, that the processing increment for each step being a frame is equivalent to the continuous processing for steps S1 through S5 as to each respective frame being executed independently from other frames (in parallel). In this case, for example, a situation may occur that when the processing in step S3 as to the first frame is being executed, the processing of step S2 as to a different second frame is executed in parallel.

Further, in reality, in many cases the pixels making up a frame to be processed are set in order of the pixels to be of interest (hereafter called pixels of interest) as that to be processed, and at least the processing in steps S3 and S4 are sequentially individually performed. That is to say, the processing increments in steps S3 and S4 are often pixels.

Thus, with the following description also, description will be given as the processing in step S3 and S4 being in pixel increments. That is to say, the processing in step S3 is processing of the imaging blur property detecting unit 12, and the processing in step S4 is processing of the imaging blur suppressing processing unit 13. Accordingly, with the description below, the processing increments will be described as pixels for the imaging blur property detecting unit 12 and imaging blur suppressing processing unit 13.

Next, several embodiments of the imaging blur suppressing processing unit 13 of the image processing device 1 in FIG. 1 will be described. Specifically, as parameters indicating imaging blur properties, several examples of the imaging blur suppressing processing unit 13 in the case of using absolute values of motion vectors (hereafter called moving speed) will be described.

In the case that moving speed is used as a parameter showing imaging blur properties, the imaging blur property detecting unit 12 sequentially sets each pixel making up the frame to be processed as pixels of interest, sequentially detects the moving vectors of the pixels of interest, and sequentially supplies these to the imaging blur suppressing processing unit as parameter values showing the imaging blur properties of the pixels of interest.

Accordingly, the imaging blur suppressing processing unit 13 sequentially sets each pixel making up the frame to be processed as pixels of interest for each frame making up the moving image, and based on the absolute value of the moving vector of the pixel of interest out of the moving vectors supplied from the imaging blur property detecting unit 12, i.e. based on the moving speed with the pixel of interest, the pixel values of the pixels of interest are sequentially corrected.

Now, the reason that the moving speed can be employed as a parameter for showing imaging blur properties will be described. The imaging blur property can generally be expressed in a state depending on the moving speed of an object subjected to shooting.

Note that the moving speed of an object subjected to shooting naturally includes the moving speed of the object (image) within a frame in the case that the object itself has moved within real space and the camera is fixed, at the time the object thereof is shot with the camera. Further, the moving speed of the object here also includes a relative moving speed of an object (image) within a frame in the case that the object is fixed in real space and the camera is moved by a hand shaking, or in the case that the object and camera are both moved in real space, at the time the object is shot with the camera.

Accordingly, the imaging blur property can be expressed in a state depending on the moving speed with each pixel making to the image of the object.

The moving speed of the pixel indicates a spatial distance between the pixel within the frame to be processed and the pixel corresponding to within a frame earlier thereof (corresponding point). For example, in the case that the spatial distance between the pixel within the frame to be processed and the image corresponding to within the immediately preceding (temporally one prior) frame is K pixels worth (K is an arbitrary integral of 0 or greater), the moving speed with the pixel thereof becomes K [pixels/frame].

In this case, if we say that of the various pixels making up the image of the object, one predetermined pixel is set as the pixel of interest, the imaging blur property of the pixel of interest can be expressed in a state depending on the size of the moving speed K [pixels/frame] with the pixel of interest.

More specifically, for example, in each of the cases that the moving speeds with the pixel of interest are 2, 3, 4 [pixels/frame], the frequency properties of imaging blur with the pixel of interest can be expressed with the curves H2 through H4 in FIG. 4, respectively.

That is to say, FIG. 4 shows each of the frequency properties of imaging blur with the pixel of interest in each of the cases that the moving speeds with the pixel of interest are 2, 3, 4 [pixels/frame]. In FIG. 4, the horizontal axis shows frequency and the vertical axis shows gain (amplitude). However, each value of the horizontal axis shows a relative value in the case that the Nyquist frequency is 1. The above is the reason that moving speed can be employed as a parameter for showing imaging blur properties.

Now, as is clear from the states of the frequency properties H2 through H4, when expressing the imaging blur properties with the pixel of interest as a spatial region, the imaging blur properties can be represented with a moving average filter (low-pass filter). In other words, a transfer function showing the moving average filter (low-pass filter) (hereafter called imaging blur transfer function) is represented by H, an ideal image signal in the case of image blurring not occurring (hereafter called signal before imaging blur) is denoted as F in the frequency region, and the actual image signal output from the camera, i.e. the image signal with imaging blur occurring (hereafter called signal after imaging blur) is represented by H in the frequency region, the signal G after imaging blur is expressed as in the following Expression (1).

$$G = H \times F \quad (1)$$

With the present invention, it is desirable to remove (suppress) imaging blur, so in order to achieve this, a signal F before imaging blur should be forecast-computed from a known signal G after imaging blur and a known transfer function H of the imaging blur. That is to say, the forecast computing in the following Expression (2) is executed.

$$F = inv(H) \times G \quad (2)$$

In Expression (2), inv(H) shows the inverse function of the transfer function H of the imaging blur. As described above, the transfer function H of the imaging blur has the properties of a low-pass filter, whereby the inverse function thereof inv(H) also naturally has the properties of a high-pass filter.

Also, as described above, with the transfer function H of the imaging blur, the properties thereof change according to moving speed. Specifically for example, in each case that the moving speed with the pixel of interest is 2, 3, 4 [pixels/frame], the frequency properties of the transfer function H of the imaging blur with the pixel of interest become differing properties as shown with each of the curves H2 through H4 in FIG. 4.

Accordingly, the imaging blur suppressing processing unit 13 modifies the properties of the transfer function H of the imaging blur according to moving speed, finds the inverse function inv(H) of the transfer function H with modified properties, and executes computing processing of the above-described Expression (2) using the inverse function inv(H), whereby the purpose of the invention, that is, removing (suppressing) imaging blur, can be achieved.

Alternatively, the above-described Expression (2) is a computation of the frequency region, so as to achieve the purpose of the present invention, the imaging blur processing unit 13 can execute processing with a spatial region equivalent to the computing processing in the above-described Expression (2). Specifically for example, the imaging blur suppressing processing unit 13 can execute processing such as the following first through third processing.

The first processing is processing to convert the properties of the moving average filter (low-pass filter) showing imaging blur with the pixel of interest according to moving speed with the pixel of interest supplied from the imaging blur property detecting unit 12. Specifically for example, processing wherein a moving average filter is prepared beforehand one at a time for each of multiple moving speeds, and one moving average filter corresponding to the moving speed with the pixel of interest is selected from the multiple moving average filters, is one example of the first processing.

The second processing is processing made up from the following processings 2-1 through 2-3.

The processing 2-1 is processing wherein, by performing Fourier transform as to the moving average filter with the properties converted with the first processing, the moving average filter there of displayed as frequencies. Specifically for example, in each case that the moving speeds with the pixel of interest are 2, 3, 4 [pixels/frame], the processing to obtain the respective curves. H2 through H4 in FIG. 4 is the processing 2-1. That is to say, to consider this in frequency regions, processing to find the transfer function H of the imaging blur with the pixel of interest is the processing 2-1. Note that hereafter the processing 2-1 will be called frequency converting processing.

The processing 2-2 is processing to compute an inverse number of the moving average filter displayed as frequency with the frequency converting processing (processing 2-1). That is to say, in terms of a frequency region, the processing generate the inverse function inv(H) of the transfer function H of imaging blur which is shown in the above-described Expression (2) is the processing 2-2. Note that hereafter the processing 2-2 will be called inverse function generating processing.

The processing 2-3 is processing to perform inverse Fourier transform as to the inverse function inv(H) computed with the inverse function generating processing (processing 2-2), i.e. the inverse number of the moving average filter displayed as frequency. That is to say, processing to generate a high-pass filter (Weiner filter or the like) corresponding to the inverse function inv(H) is the processing 2-3. Processing to generate the inverse filter of the moving average filter is the processing 2-3. Note that the high-pass filter generated with the processing 2-3 is called an inverse moving average filter. In other words, the processing to convert the inverse moving average filter expressed with a frequency region into a filter with a spatial region is the processing 2-3. Accordingly, hereafter the processing 2-3 will be called frequency inverse converting processing, corresponding to the frequency converting processing which is the processing 2-1.

The third processing is processing to input an image signal g of the spatial region corresponding to the signal G of the above-described Expression (2) of the frequency region after imaging blur as an input image, and to apply the inverse moving average filter generated by the frequency inverse converting processing (processing 2-3) as to the image signal g. With the third processing, an image signal f of a spatial region corresponding to the signal F of the above-described Expression (2) of the frequency region before imaging blur is restored (forecast computed). Specifically for example, the processing wherein, by applying the inverse moving average filter as to a predetermined block including the pixel of interest of the frame to be processed, the pixel value of the pixel of interest is corrected, is the third processing.

An example of the functional configuration of the imaging blur suppressing processing unit 13 which can execute the first through third processing is shown in FIG. 5. That is to say, FIG. 5 shows an example of the functional configuration of the imaging blur suppressing processing unit 13.

With the imaging blur suppressing processing unit 13 in the example in FIG. 5, a moving average filter property converting unit 21, inverse moving average filter generating unit 22, and inverse moving average filter unit 23 are provided thereto.

The moving average filter property converting unit 21 executes the above-described first processing. The inverse moving average filter generating unit 22 executes the above-described second processing. The inverse moving average filter unit 23 executes the above-described third processing.

Figure 6:
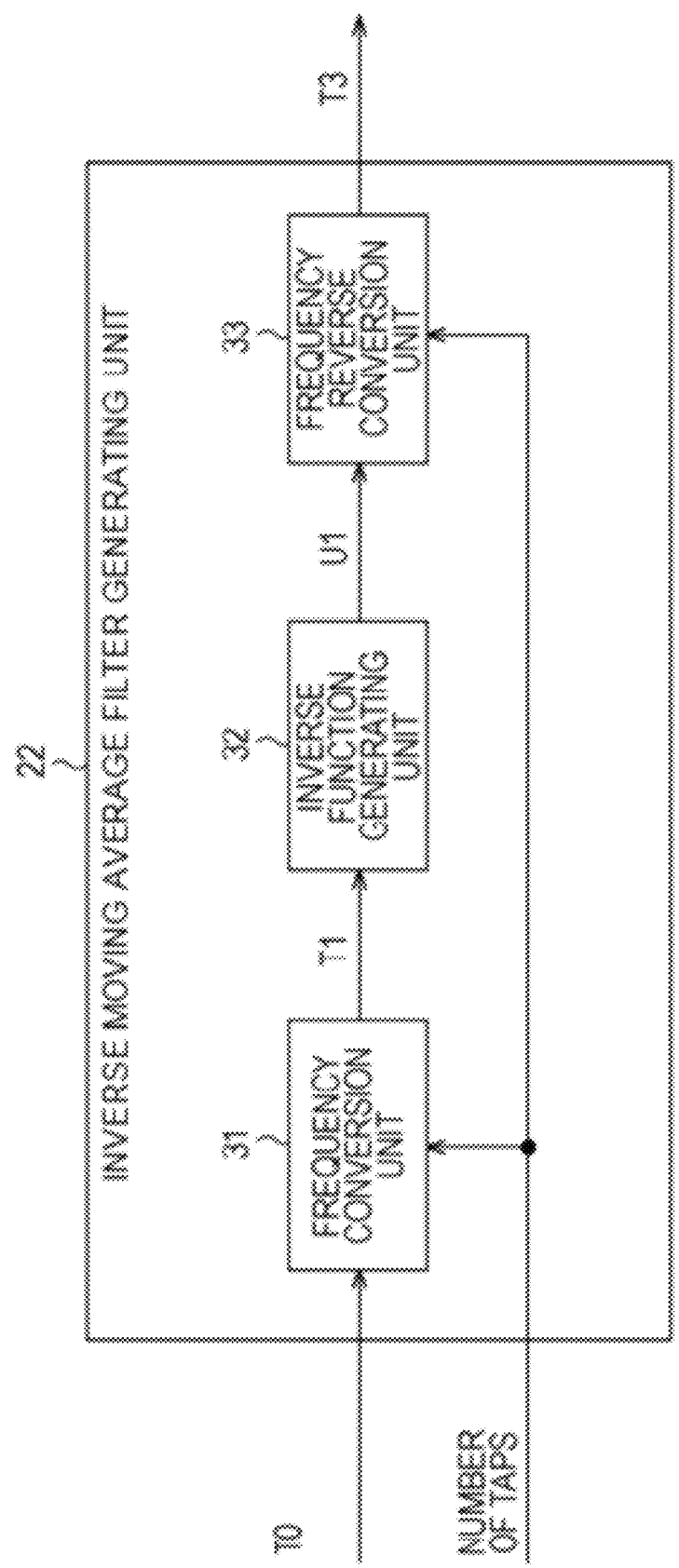
FIG. 6 is a block diagram illustrating an example of a functional configuration of a inverse moving average filter generating unit of the image blur suppressing processing unit in FIG. 5.

That is to say, the inverse moving average filter generating unit 22 may have a functional configuration such as that shown in FIG. 6, for example. A frequency converting unit 31, inverse function generating unit 32, and frequency inverse converting unit 33 are provided on the inverse moving average filter generating unit 22 in FIG. 6.

The moving average filter with properties converted with the moving average filter property converting unit 21 is input as an input signal T0 which is a spatial region signal as to the frequency converting unit 31. Thus, the frequency converting unit 31 performs the above-described frequency converting processing as to the input signal T0, and outputs a signal T1 indicating the transfer function H of the imaging blur obtained as a result thereof.

Note that the signal T1 is a signal which is sampled with a previously set number of taps. Therefore, the same number of taps is also input in the inverse frequency converting unit 33 which performs the above-described frequency inverse converting processing.

The inverse function generating unit 32 performs the above-described inverse function generating processing as to the signal T1, and generates and outputs a signal U1 corresponding to the inverse function inv(H) obtained as a result thereof.

Figure 9:
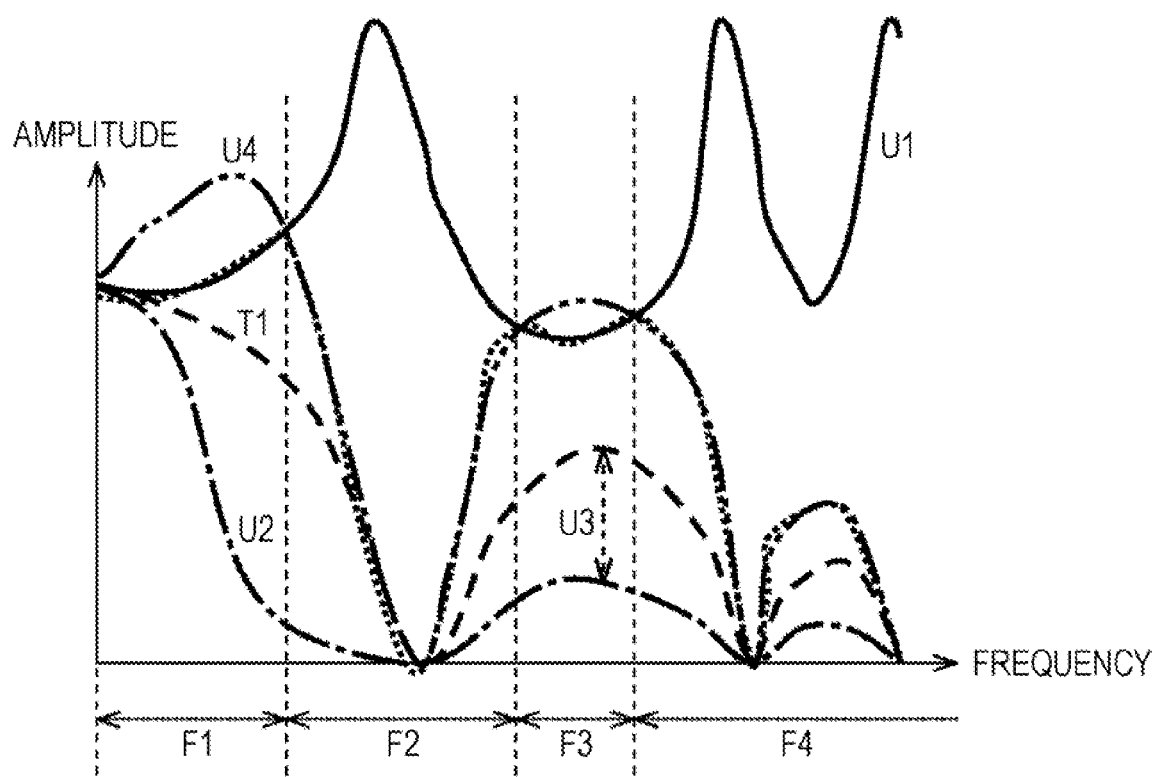
FIG. 9 is a diagram illustrating an example of the frequency property of each output signal of the components of the adjusted inverse function generating unit in FIG. 7.

That is to say, the signal U1 of the waveform shown in FIG. 9 to be described later, for example, is generated, and provided to the frequency inverse converting unit 33. However, as shown with the frequency properties H2 through h4 in FIG. 4, frequencies with a gain of zero are included in the moving average filter showing imaging blur (the frequency property thereof). Therefore, generating an inverse function inv(H) of the transfer function H of the imaging blur is difficult for the inverse function generating unit 32. Thus, in reality, the inverse function generating unit 32 generates a function holding the frequency properties worth an offset amount a (hereafter called offset function Hoff) is generated, and an inverse function inv(Hoff) of such offset function Hoff is generated as a signal U1 and output.

The frequency inverse converting unit 33 performs the above-described frequency inverse converting processing as to the signal U1, whereby a signal T3 showing the inverse moving average filter is generated and output. The reverse movement average filter corresponding to the signal T3 is input in the inverse moving average filter unit 23 in FIG. 5, and is used to execute the above-described third processing.

However, in the case that inverse moving average filter generating unit 22 of the imaging blur suppressing processing unit 13 is configured as shown in FIG. 6, the following problem can occur. That is to say, as shown with the frequency properties H2 through H4, the frequency properties of the transfer function H of imaging blur includes frequencies with a gain of zero. Therefore, as described above, the inverse moving average filter generating unit 22 temporarily generates the offset function Hoff having an offset a in the frequency properties of the transfer function H, generates the inverse function of such offset function Hoff, and outputs the inverse moving average filter of a spatial region corresponding thereto as output signal T3. However, as shown with the waveform of the signal U1 shown in the later-described FIG. 9, the inverse moving average filter can have a property with an extremely high gain in the proximity of the frequency with a gain of 0 with the transfer function H of the imaging blur (hereafter called zero point). Accordingly, there may be cases that a new problem occurs, wherein the noise of the frequency band in the proximity of the zero point is excessively emphasized, and consequently video failure may occur.

Figure 7:
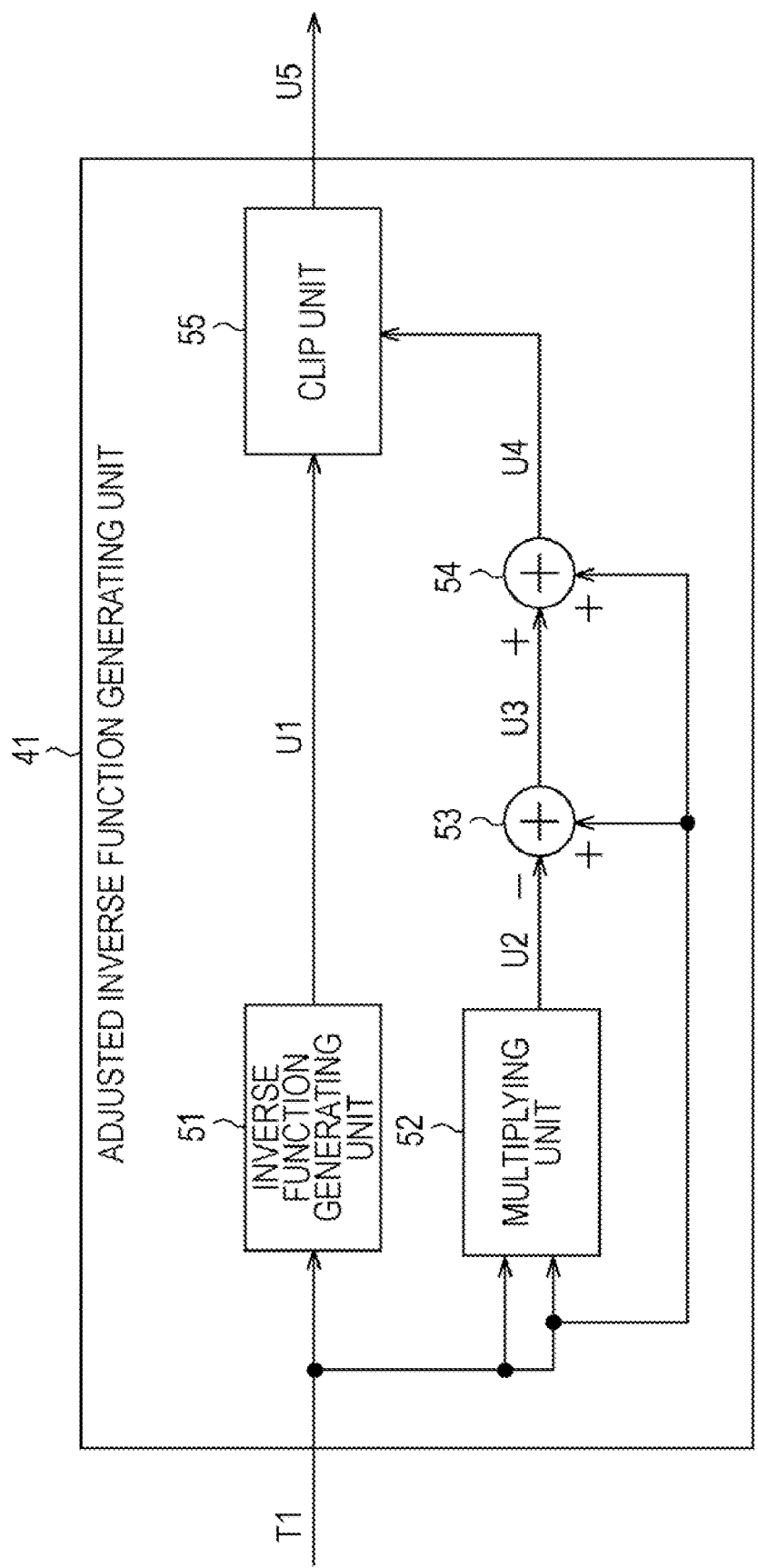
FIG. 7 is a block diagram illustrating an example of a functional configuration of an adjusted inverse function generating unit employed instead of the inverse function generating unit in FIG. 6, which is an adjusted inverse function generating unit to which the present invention is applied.
Figure 8:
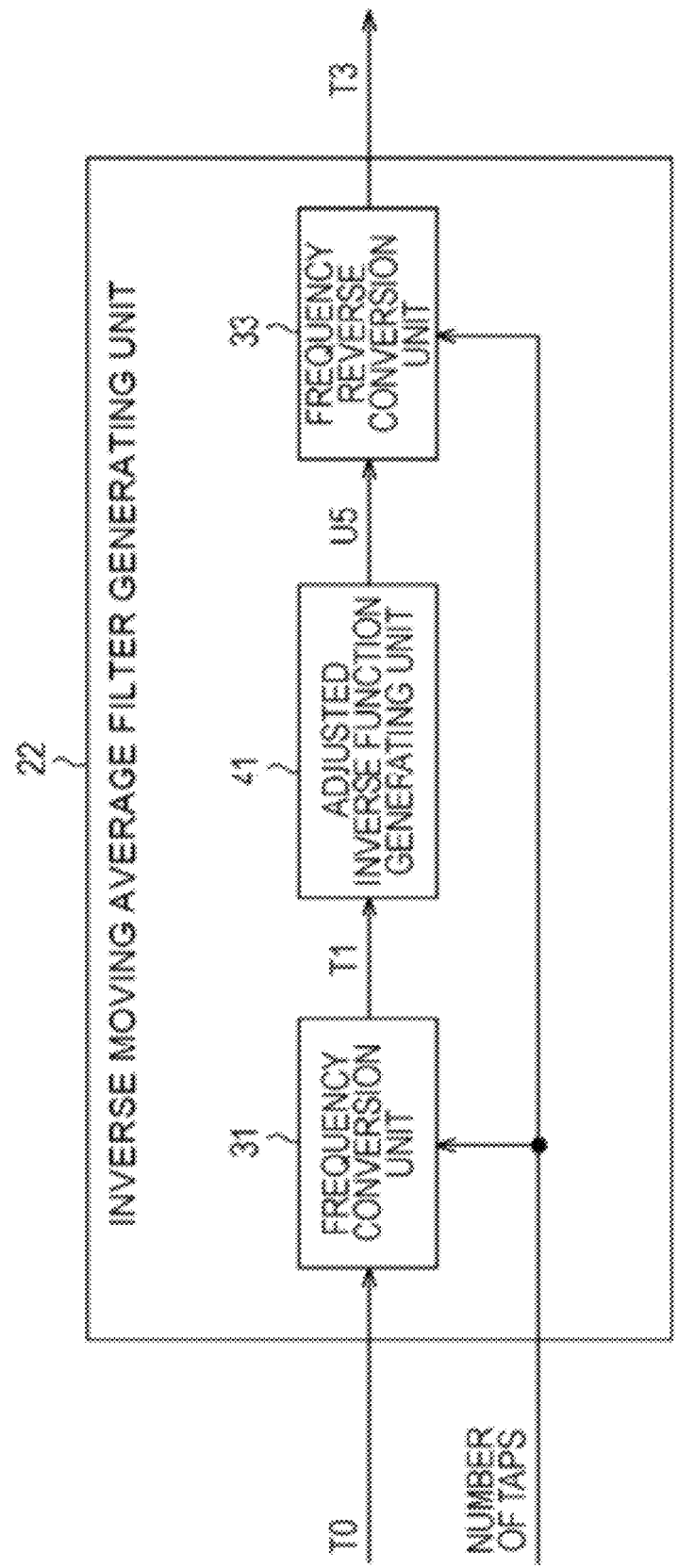
FIG. 8 is a block diagram illustrating an example differing from FIG. 6 with the functional configuration of the inverse moving average filter generating unit within the imaging blur suppressing processing unit in FIG. 5, and illustrates a case employing the adjusted inverse function generating unit in FIG. 7.

Thus, to solve this problem, the present inventors have invented an adjusted inverse function generating unit 41 in the configuration in FIG. 7, instead of the inverse function generating unit 32. That is to say, as shown in FIG. 8, the above-described problems can be solved by using the adjusted inverse function generating unit 41 in the configuration in FIG. 7 as a component of the inverse moving average filter generating unit 22 instead of the inverse function generating unit 32. In other words, this is an example of a functional configuration of the inverse moving average filter generating unit 22 of the imaging blur suppressing processing unit 13 to which the present invention is applied, and shows an example different from that in FIG. 6.

The adjusted inverse function generating unit 41 of the configuration in FIG. 7 will be described in further detail. As shown in FIG. 7, the adjusted inverse function generating unit 41 is made up of an inverse function generating unit 51, multiplying unit 52, subtracting unit 53, adding unit 54, and clip unit 55. Note that the functions for each function block will be described as appropriate during the description of operations below.

The operation of the adjusted inverse function generating unit 41 with the configuration herein will be described with reference to FIG. 9 as appropriate. That is to say, FIG. 9 shows an example of the frequency properties of the output signal for each component of the adjusted inverse function generating unit 41.

Also, computation of the adjusted inverse function generating unit 41 means computation in a frequency region. Accordingly, hereafter, computation for addition, subtraction, multiplication, and division will be understood to mean computation of the amplitude (gain) of each frequency.

The input signal T1 to the adjusted inverse function generating unit 41 is a signal showing a transfer function H of the imaging blur wherein the properties are converted according to the moving speed, as described. Specifically for example, let us say that the input signal T1 of the waveform in FIG. 9 is input in the adjusted inverse function generating unit 41. The input signal T1 herein is input into each of the inverse function generating unit 51, multiplying unit 52, subtracting unit 53, and adding unit 54.

The inverse function generating unit 51 has a function and configuration basically similar to that of the inverse function generating unit 32 in FIG. 6. That is to say, a signal similar to the signal U1 in FIG. 6, i.e. the signal U1 of the waveform in FIG. 9 is output from the inverse function generating unit 51, and is provided to the clip unit 55. Signal U1 is a signal showing the inverse function inv(H) of the transfer function H of the imaging blur, and more accurately is the inverse function inv(Hoff) of the offset function Hoff, as described above.

The multiplying unit 52 computes the square of the input signal T1, and outputs the signal U2 (=T1·T1) obtained as a result thereof to the subtracting unit 53. That is to say, the signal U2 of the waveform in FIG. 9 is input to the subtracting unit 53.

The subtracting unit 53 subtracts the output signal U2 of the multiplying unit 52 from the input signal T1, and outputs the signal U3 (=T1−U2) obtained as a result thereof to the adding unit 54. That is to say, as shown in FIG. 9, the difference for every gain of each frequency of the signal T1 and signal U2 becomes the frequency gain for the signal U3.

The adding unit 54 adds the output signal U3 of the subtracting unit 53 to the input signal T1, and outputs the signal U4 (=T1+U3) obtained as a result thereof to the clip unit 55. That is to say, the signal U4 of the waveform in FIG. 9 is input in the clip unit 55.

Of the output signal U1 of the inverse function generating unit 51 and the output signal U4 of the adding unit 54, the clip unit 55 extracts that with the lower amplitude for each frequency, and outputs the signal U5 obtained as a result thereof. That is to say, a signal showing a function (hereafter called adjusted inverse function) having the frequency properties of the signal U1 in the frequency band F1, having the frequency properties of the signal U4 in the frequency band F2, having the frequency properties of the signal U1 in the frequency band F3, and having the frequency properties of the signal U4 in the frequency band F4, is output as a signal U5. That is to say, an inverse moving average filter (spatial region signal) corresponding to the signal U5 having such frequency properties is output from the frequency converting unit 33 in FIG. 8 as a signal T3, and is employed to execute the above-described third processing with the inverse moving average filter unit 23 in FIG. 5.

Now, the two following points should be kept in mind. The first point is that the frequency properties of the inverse moving average filter of the frequency bands F2 and F4 including zero points in FIG. 9 do not use the properties of the signal U1 in the direction of increasing amplitude, but use the properties of the signal U4 in the direction of decimating amplitude. Accordingly, the noise in the frequency bands F2 and F4 is not emphasized, and consequently video failure can be suppressed. That is to say, the above-described problems can be solved.

The second point is that the frequency properties of the inverse moving average filter of the low frequency band F1 have the properties of the signal U1, i.e. the properties of the inverse function inv(H) of the transfer function H of the imaging blur. Accordingly, the imaging blur suppressing advantage itself can maintain a comparable level even when compared with the case of using the properties of the signal U1 with all of the frequency bands F1 through F4 of the inverse moving average filter (i.e. in the case that the inverse moving average filter generating unit 22 having the inverse function generating unit 32 in FIG. 6 is employed).

To summarize the above two points, by employing the configuration in FIG. 8 instead of the configuration in FIG. 6 as the inverse moving average filter generating unit 22 in FIG. 5, an advantage can be realized that failure resulting from noise emphasis and so forth can be suppressed, while imaging blur can be accurately performed.

Further, in the end, the above-described advantages can be realized by employing the imaging blur suppressing processing unit 13 having a configuration such as follows. In other words, the imaging blur suppressing processing unit 13 having is nothing more than an exemplification of at least a portion of an image processing device having a configuration such as follows.

That is to say, for an access unit to be processed, if an image processing device corrects the access unit to be processed by changing the properties of a low-pass filter which indicates imaging blur according to parameter values showing the properties of imaging blur which occurs at the time that the moving image is shot with the video shooting device, generating an inverse filter having inverse properties as to the low-pass filter, and performing processing to apply the inverse filters as to the access unit to be processed; wherein, with a frequency of which the frequency property of the low-pass filter indicating the imaging blur is zero being zero points, performing processing to apply the inverse filter is forbidden for predetermined frequency components of the frequency components of the access unit to be processed including the zero points, the above-described advantages can be realized.

As an embodiment of the imaging blur suppressing processing unit 13 of the image processing device 1 in FIG. 1 to which the present invention is applied, the imaging blur suppressing processing unit 13 having the functional configuration in FIG. 5 has been described.

In the event that pixel value correction for each pixel value is performed, the imaging blur suppressing processing unit 13 uses moving speed (absolute value of moving vector) as a parameter with the above-described example, but other than the moving speed, any arbitrary parameter may be used as long as the parameter indicates imaging blur properties.

Specifically for example, the imaging blur suppressing processing unit 13 can use camera shutter speed at the point in time that the moving image to be processed is shot, as a parameter indicating imaging blur properties. This is because if the shutter speed differs, the imaging blur degrees differ by the amount of time Ts in the same diagram, as shown in FIG. 10, for example.

Figure 10:
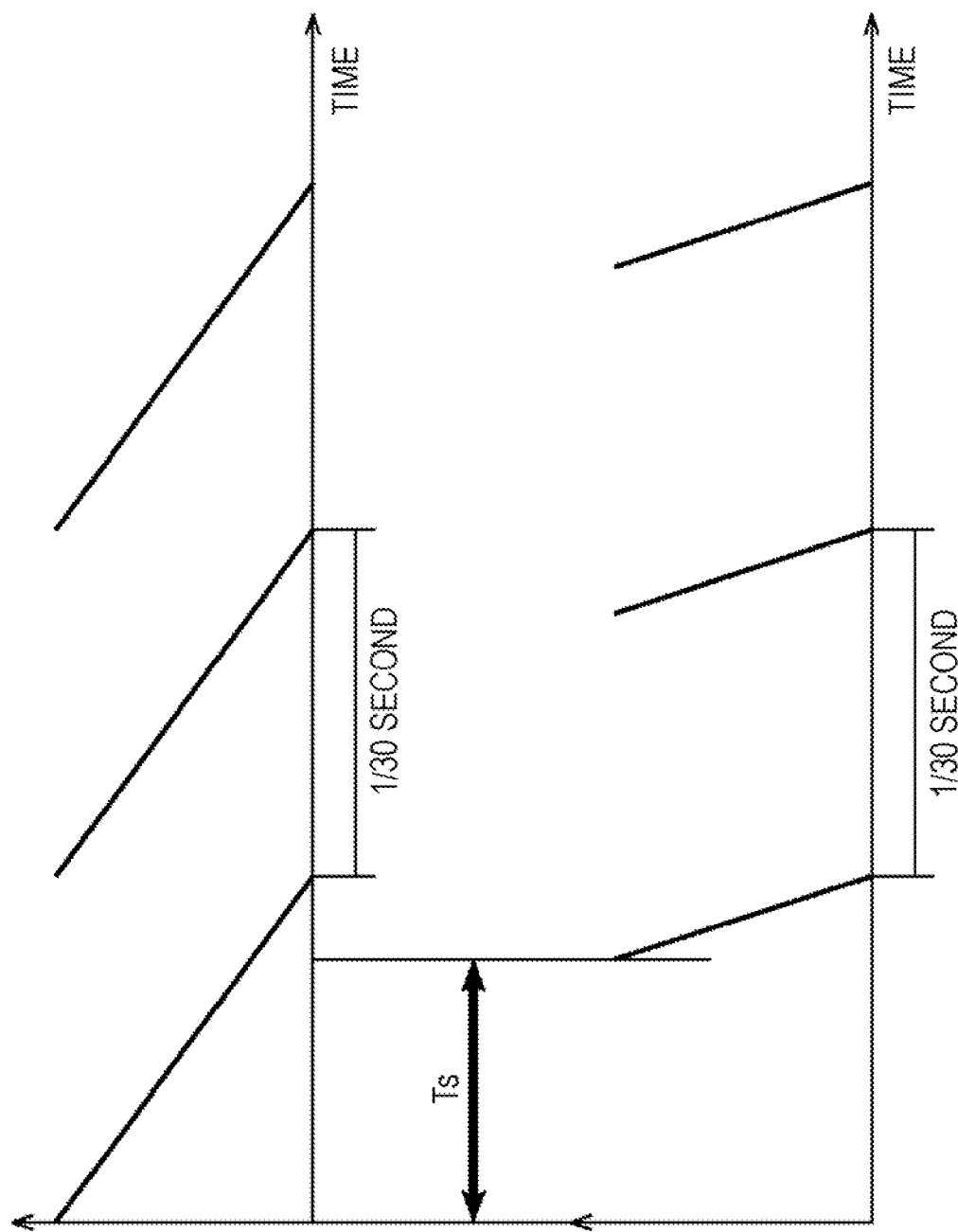
FIG. 10 is a diagram describing camera shutter speed and imaging blur properties.

That is to say, in FIG. 10, the diagram on the upper side shows a diagram in the case that the shutter speed is 1/30 second which is the same as the frame speed, and the diagram on the lower side shows a diagram in the case that the shutter speed is an earlier (1/30−Ts) seconds than the frame speed. With both diagrams in FIG. 10, the vertical axis shows a time axis, and the vertical axis shows the rate of shutter opening time. The rate of shutter opening time is, for example, is a rate expressed by (Ta/V)×100 [%] in the case that the shutter speed is V [seconds] (V is an arbitrary value of 0 or greater than 0), the rate of a first point-in-time that the shutter is opened being 0%, the rate of a second point-in-time that the shutter is closed from the first point-in-time until V [seconds] have elapsed being 100%, and the time Ta [seconds] (Ta is an arbitrary positive value of 0 or greater than 0 and at or below V) from the first point-in-time until the current point-in-time. In this case, with the vertical axis in both diagrams in FIG. 10, the value touching the time axis becomes 100 [%], and the maximum value (the value on the highest position of each line) becomes 0 [%]. That is to say, with the vertical axis in both diagrams in FIG. 10, the lower on the vertical axis, the greater the rate of shutter opening time becomes.

For example, let us say that one detecting element of the camera is corresponding to one pixel within the frame. In this case, as shown in the diagram on the upper side of FIG. 10, when the shutter speed is 1/30 second, an integrated value of input light during the 1/30 second that the shutter is open is output from the one detecting element of the camera as a pixel value of the corresponding pixel.

Conversely, in the case that the shutter speed is (1/30−Ts) second, the integrated value of input light during the (1/30−Ts)

second that the shutter is open is output from the one detecting element of the camera as a pixel value of the corresponding pixel.

That is to say, the shutter speed corresponds to the time that light accumulates in the detecting element. Accordingly, in the case that if there is an object moving in a real space across in front of a predetermined detecting element, for example, light differing from the light corresponding to the object, e.g. background light is input the amount of time Ts [seconds] more so when the shutter speed is 1/30 seconds rather than (1/30−Ts) seconds. Thus, the rate that the accumulating values of light such as background light which differs from that of the object is combined in the pixel values output from one detecting element is greater when the shutter speed is 1/30 seconds than when the shutter speed is (1/30−Ts) seconds. Consequently, the degree of imaging blur is greater.

To summarize the above, the slower the shutter speed becomes, the greater the degree of imaging blur becomes. That is to say, shutter speed can be said to indicate one property of imaging blur. Accordingly, shutter speed, as with moving speed, can be used as a parameter to indicate imaging blur properties.

Note that in the case such shutter speed is used as a parameter to indicate imaging blur properties, the imaging blur property detecting unit 12 in FIG. 1 analyzes header information and so forth appended to the moving image (data) supplied from a high frame rate converting unit 11, for example, shutter speed for each frame is detected, and these can be supplied to the imaging blur suppressing processing unit 13 as parameters to indicate imaging blur properties. The imaging blur suppressing processing unit 13 executes the above-described series of processing using the shutter speed instead of moving speed, for example, whereby each pixel value can be appropriately corrected. The configuration of the imaging blur suppressing processing unit 13 in the case of using the shutter speed can assume basically the same configuration as that in the case of using moving speed. That is to say, the imaging blur suppressing processing unit 13 having the functional configuration in FIG. 5 as described above can execute the above-described series of processing using the shutter speed as parameter values, thus appropriately correcting each pixel value.

The above description is given for an image processing device 1 having the functional configuration shown in FIG. 1 as an embodiment of the image processing device to which the present invention is applied, but the present invention is not limited to the example in FIG. 1, and may take various other embodiments thereof.

Figure 11:
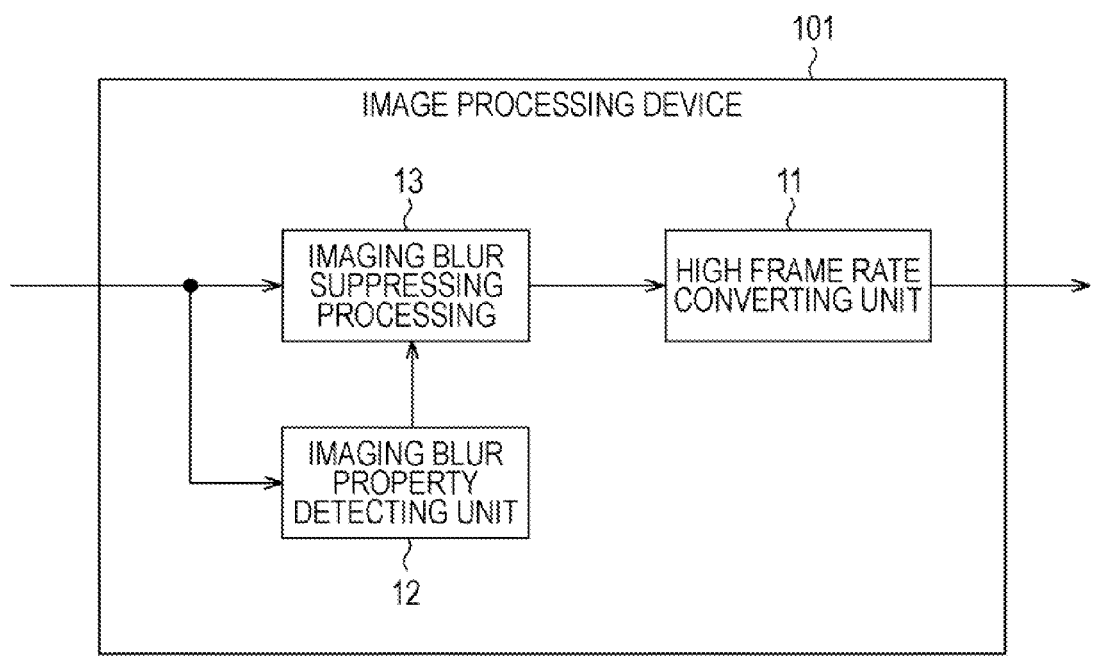
FIG. 11 is a block diagram illustrating an example different from FIG. 1 with the functional configuration of the image processing device to which the present invention is applied.

Specifically for example, function block diagrams for other embodiments of an image processing device to which the present invention is applied are shown in each of FIGS. 11 through 14. For example, the image processing device 101 in FIG. 11 is made up of a high frame rate converting unit 11, imaging blur property detecting unit 12, and imaging blur suppressing processing unit 13, similar to the image processing device 1 in FIG. 1.

However, with the image processing device 101 in FIG. 11, the moving image to be subjected to correction processing with the imaging blur suppressing processing unit 13 is the input moving image of the image processing device 101, i.e. the moving image before high frame rate converting processing is performed with a high frame rate converting unit 11. Thus, the imaging blur property detecting unit 12 also detects parameter values indicating imaging blur properties from the moving images before high frame rate converting processing is performed with the high frame rate converting unit 11, and supplies the detection results thereof to the imaging blur suppressing processing unit 13.

Accordingly, the image processing of the image processing device 101 in FIG. 11 becomes processing of the image processing in FIG. 3 wherein each of the processing steps S1, S3, S4, S2, and 55 are executed in such sequence.

Figure 12:
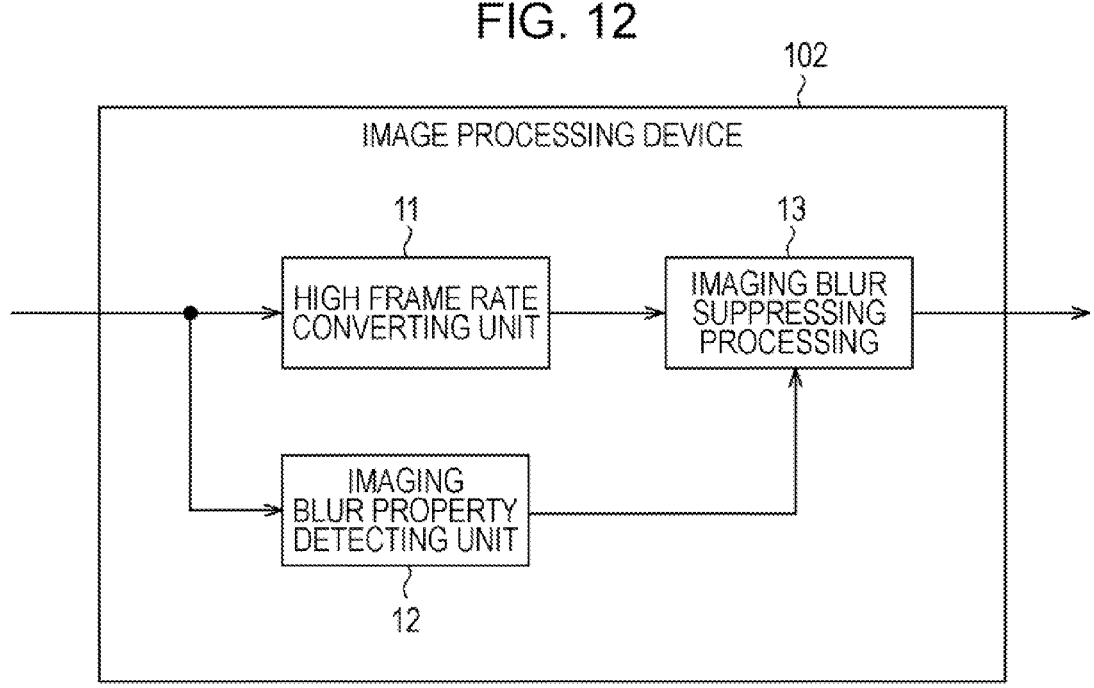
FIG. 12 is a block diagram illustrating an example different from FIGS. 1 and 11 with the functional configuration of the image processing device to which the present invention is applied.

Also, for example, the image processing device 102 in FIG. 12 is made up of a high frame rate converting unit 11, imaging blur property detecting unit 12, and imaging blur suppressing processing unit 13, similar to the image processing device 1 in FIG. 1 and image processing device 101 in FIG. 11.

With the image processing device 102 in FIG. 12, the moving image to be subjected to correction processing with the imaging blur suppressing processing unit 13 is the moving image obtained as a result of high frame rate converting processing performed as to the input moving image by the high frame rate converting unit 11, similar to the image processing device 1 in FIG. 1. That is to say, the imaging blur suppressing processing unit 13 performs correction processing as to the moving image after high frame rate converting processing is performed.

However, the imaging blur property detecting unit 12 of the image processing device 102 in FIG. 12 detects a parameter indicating imaging blur properties from the input moving image, i.e. from the moving image before the high frame rate converting processing is performed with the high frame rate converting unit 11, and supplies the detection results thereof to the imaging blur suppressing processing unit 13. That is to say, the imaging blur suppressing processing unit 13 of the image processing device 102 in FIG. 12 uses the parameter values detected from the moving image before high frame rate converting processing is performed, and corrects each of the pixel values.

From the above, the image processing of the image processing device 102 in FIG. 12 also becomes processing to be executed in a similar flow as the image processing in FIG. 3, i.e. the processing of each of the steps S1, S2, S3, S4, and S5 are executed in such sequence. However, with the processing in step S3, the processing can be said to "detect the parameter values indicating imaging blur properties from the moving image before high frame rate converting processing is performed, i.e. from each frame making up the moving image input with the processing in step S1."

Figure 13:
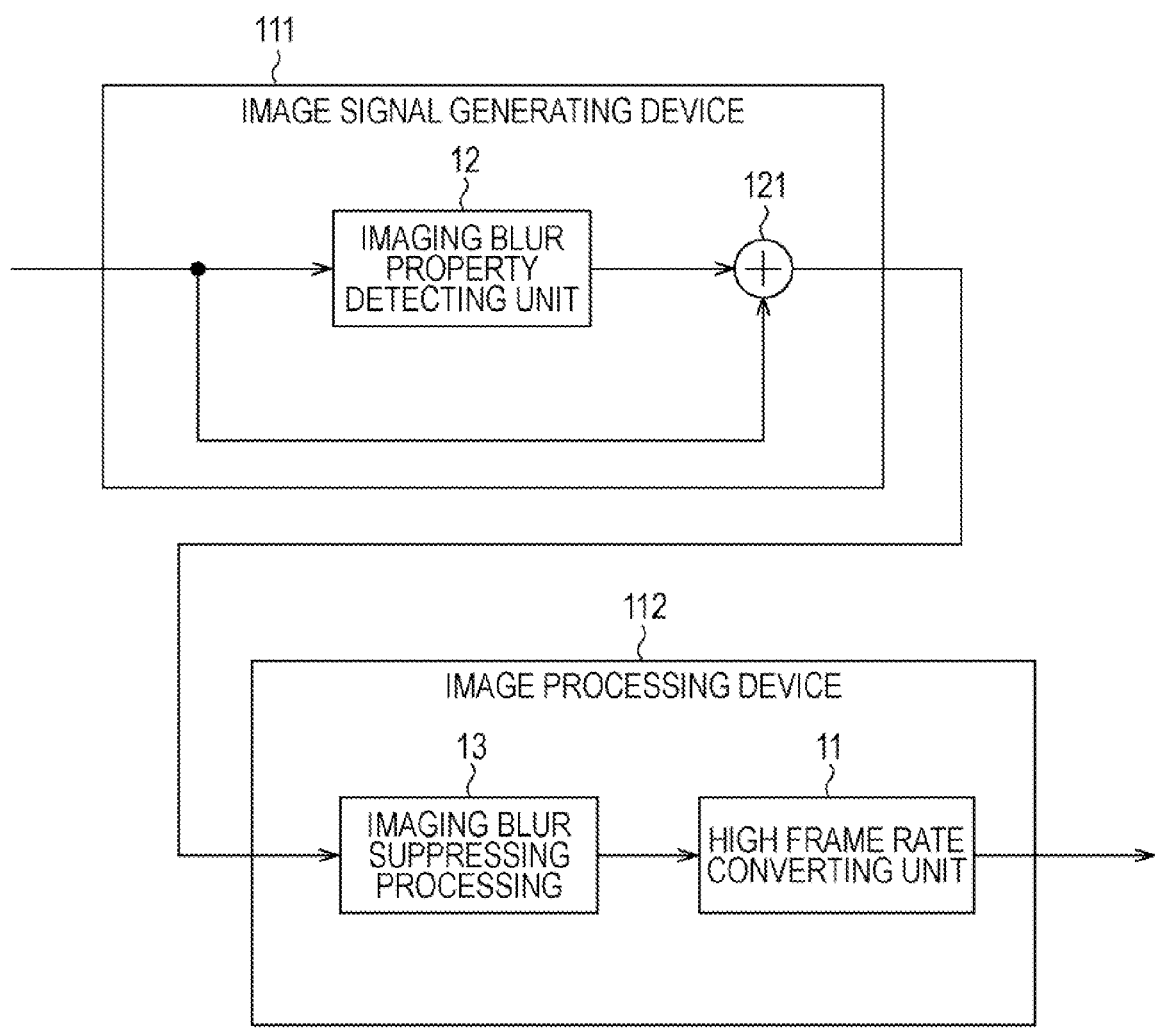
FIG. 13 is a block diagram illustrating an example different from FIGS. 1, 11, and 12 with the functional configuration of the image processing device to which the present invention is applied.
Figure 14:
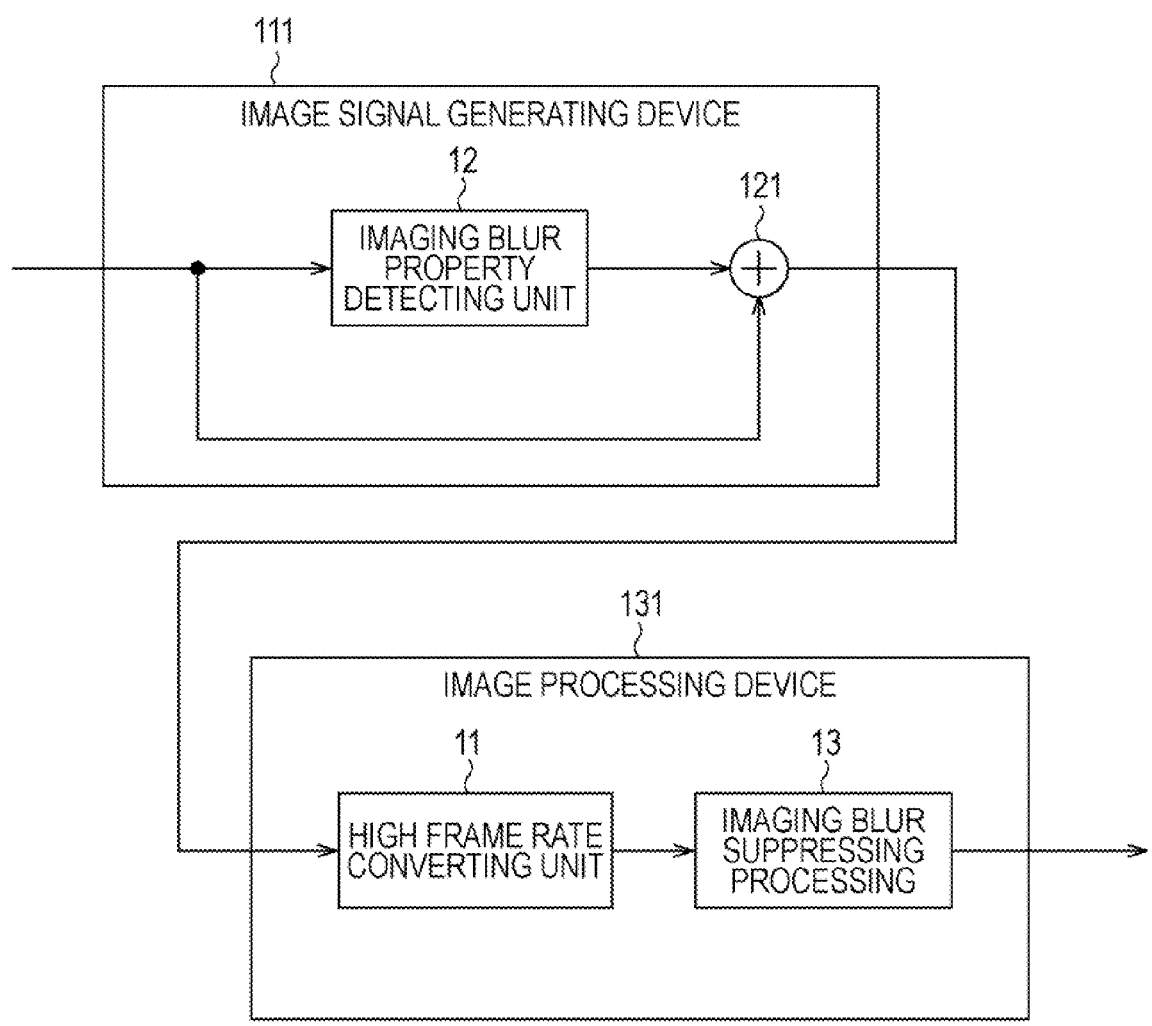
FIG. 14 is a block diagram illustrating an example different from FIGS. 1, 11, 12, and 13 with the functional configuration of the image processing device to which the present invention is applied.

As opposed to such an image processing device 101 in FIG. 11 and image processing device 102 in FIG. 12, the image processing device 112 in FIG. 13 and image processing device 131 in FIG. 14 are made up of a high frame rate converting unit 11 and imaging blur suppressing processing unit 13, and the imaging blur property detecting unit 12 is not included in the components thereof.

That is to say, as shown in FIGS. 13 and 14, the imaging blur property detecting unit 12 is provided along with a superimposed portion 121 within another image processing device 111 (hereafter called image signal generating device 111 to match the description in the diagram). The moving image input in the image signal generating device 111 is supplied to the imaging blur property detecting unit 12 and superimposed portion 121. The imaging blur property detecting unit 12 detects the parameter values indicating imaging blur properties from the moving image herein, and supplies this to the superimposed portion 121. The superimposed portion 121 superimposes the parameter values indicating imaging blur properties as to the moving image, and outputs a signal obtained as a result thereof.

Accordingly, the moving image (signal) on which the parameter values indicating imaging blur properties is superimposed is supplied to the image processing device 112 in FIG. 13 and image processing device 131 in FIG. 14 from the image signal generating device 111.

Thus, for example, with the image processing device 112 in FIG. 13, the imaging blur suppressing processing unit 13 separates the parameter values indicating imaging blur properties and the moving image, and corrects each pixel value based on the separated parameter values indicating the imaging blur properties for each of the frames making up the separated moving image.

Next, the high frame rate converting unit 111 performs high frame rate converting processing as to the moving image corrected with the imaging blur suppressing processing unit 13, and the moving image obtained as a result thereof, i.e. the moving image subjected to high frame rate conversion and correction is output.

Thus, the image processing of the image processing device 112 in FIG. 13 becomes processing of the image processing in FIG. 3 wherein each of the processing in steps S1, S4, S2, and S5 are executed in such sequence.

For example, with the image processing device 131 in FIG. 14, the high frame rate converting unit 11 separates the parameter values indicating imaging blur properties and the moving image, and subjects the separated moving image to high frame rate converting processing, and supplies the moving image obtained as a result thereof, i.e. the moving image converted to a high frame rate to the imaging blur suppressing processing unit 13. At this time, the parameter values indicating imaging blur properties separated with the high frame rate converting unit 11 will also be supplied to the imaging blur suppressing processing unit 13.

Next, the imaging blur suppressing processing unit 13 corrects each pixel value based on the parameter values indicating imaging blur properties for each of the frames making up the moving image converted to a high frame rate, and outputs the moving image obtained as a result thereof, i.e. the moving image subjected to correction and converted to a high frame rate.

Now, the above-described series of processing (or a portion of processing thereof) can be executed with hardware, but also can be executed with software.

In this case, all of the image processing device 1 in FIG. 1 or a portion thereof (e.g. the imaging blur suppressing processing 13 and the like), all of the image processing device 101 in FIG. 11 or a portion thereof, all of the image processing device 102 in FIG. 12 or a portion thereof, all of the image processing device 112 in FIG. 13 or a portion thereof, and all of the image processing device 131 in FIG. 14 or a portion thereof, are configured with a computer such as that shown in FIG. 15, for example.

In FIG. 15, the CPU (Central Processing Unit) 201 executes various types of processing according to a program recorded in ROM (Read Only Memory) 202 or a program loaded in RAM (Random Access Memory) 203 from a storage unit 208. The data for the CPU 201 to execute various types of processing is stored as appropriate in the RAM 203.

The CPU 201, ROM 202, and RAM 203 are mutually connected via a bus 204. The bus 204 is also connected to an input/output interface 205. The input/output interface 205 is connected to an input unit 206 made up of a keyboard, mouse, and so forth, an output unit 207 made up of a display and so forth, a storage unit 208 made up of a hard disk and so forth, and a communication unit 209 made up of a modem, terminal adapter, and so forth. The communication unit 209 performs communication processing with other image processing devices via a network including the Internet. The input/output interface 205 is also connected to a driver 210 as suitable, a removable recording medium 311 made up of a magnetic disk, optical disk, magneto-optical-disk, or semiconductor memory and so forth is mounted thereto as appropriate, and a computer program read out therefrom is installed in the storage unit 208 as suitable.

In the case that the series of processing is to be executed by software, the program making up the software is installed from a network or recording medium into a computer built into dedicated hardware, or a general-use personal computer which can execute various types of functions by installing various types of programs.

A recording medium including such a program is not restricted to being made up of a removable recording medium (packaged media) 211 such as a magnetic disk (including floppy disk), optical disk (including CD-ROM (Compact Disk-Read Only Memory), DVD (Digital Versatile Disk), optical magnetic disk (including MD (Mini-Disk)), or semiconductor memory on which the program is recorded, which is distributed separately from the main device unit to provide users with the program, but is also made up of a ROM 202 on which the program is recorded or the hard disk included in the storage unit 208, which are provided to the users in a state of being built into the main device unit beforehand.

Note that with the present specification, the steps describing the program recorded on the recording medium include processing performed in a time-series manner along a sequence thereof, but is not necessarily restricted to processing in a time-series manger, and also includes processing to be executed in parallel or individually.

Also, as described above, with the present specification, the term "system" indicates the entirety of equipment configured of multiple processing devices or processing units.

Further, with the high frame rate converting processing executed in the above-described embodiments, the combination of the first frame rate (frame frequency) of the input video signal and the second frame rate (frame frequency) of the output video signal is not particularly restricted, and may be in an arbitrary combination thereof. Specifically for example, 60 (or 30) [Hz] can be employed as the first frame rate of the input video signal, and 120 [Hz] can be employed as the second frame rate of the output video signal. For example, 60 (or 30) [Hz] can be employed as the first frame rate of the input video signal, and 240 [Hz] can be employed as the second frame rate of the output video signal. Also, for example, 50 [Hz] corresponding to a PAL (Phase Alternation by Line) method can be employed as the first frame rate of the input video signal, and 100 [Hz] or 200 [Hz] can be employed as the second frame rate of the output video signal. Further, for example, 48 [Hz] corresponding to telecine can be employed as the first frame rate of the input video signal, and a predetermined frequency greater thereof can be employed as the second frame rate of the output video signal.

Note that by performing high frame rate converting processing with the above-described various embodiments as to the input video signal originating from a television method according to the related art, content according to the related art can be displayed with high quality.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device configured to process a moving image shot by a video shooting device in increments of the moving image comprising:

a processor; and a correcting means comprising:

a low-pass filter property converting means that converts the properties of the low-pass filter into properties according to one or more parameter values detected by a detecting means, and outputs a spatial region signal;

a frequency converting means that converts the low-pass filter generated as a spatial region signal into a first signal of a frequency region with the low-pass filter property converting means;

a signal generating means configured to generate, based on the first signal, a second signal, the second signal having frequency properties corresponding to the inverse filter in a first frequency band not including a frequency with a gain of zero, and having frequency properties with amplitude thereof below a predetermined value in a second frequency band including a frequency with a gain of zero;

a frequency inverse conversion means that converts the second signal into an output filter; and a filtering means that corrects the access element by applying the output filter to the access element, the correcting means correcting at least one access element by changing properties of a low-pass filter indicating an imaging blur according to parameter values describing properties of the imaging blur occurring at a time that the moving image is shot by the video shooting device, generating an inverse filter having properties corresponding to an inverse transfer function of the low-pass filter, and processing the at least one access element by applying the inverse filter to the access element;

wherein a frequency property of the low-pass filter contains at least one frequency with a gain of zero, and wherein the inverse filter is not applied when a frequency component of the access element has a gain of zero.

2. The image processing device according to claim 1, wherein the predetermined value corresponds to the value of the inverse filter.

3. The image processing device according to one of claims 1 or 2, the signal generating means further comprising:

an inverse signal generating means configured to generate an inverse signal in which the first and second frequency bands of the inverse signal correspond to the inverse filter, based on the first signal;

a multiplying means configured to compute the square of the first signal and output the result as a first intermediate signal;

a subtracting means configured to subtract the first intermediate signal from the first signal and output the result as a second intermediate signal;

an adding means configured to add the second intermediate signal to the first signal and output the result as an adjusted signal; and an adjusting means configured to generate and output the second signal, the second signal having frequency properties of the inverse signal generated by the inverse signal generating means in the first frequency band not including a frequency with a gain of zero, and having frequency properties of the adjusted signal output from the adding means in the second frequency band including a frequency with a gain of zero.

4. The image processing device according to claim 1, wherein the parameter values describing the properties of the imaging blur are respective moving vectors in at least one pixel of the pixels making up the access element, for each of a plurality of access elements making up the moving images.

5. An image processing method for processing a moving image shot by a video shooting device in increments of the moving image, comprising:

correcting at least one access element to be processed by changing properties of a low-pass filter indicating an imaging blur according to parameter values describing properties of the imaging blur occurring at a time that the moving image is shot by the video shooting device, generating an inverse filter having properties corresponding to an inverse transfer function of the low-pass filter, processing the at least one access element by applying the inverse filter as to the access element;

converting the properties of the low-pass filter into properties according to one or more parameter values detected by a detector, and outputting a spatial region signal;

converting the low-pass filter generated as a spatial region signal into a first signal of a frequency region;

generating, based on the first signal, a second signal, the second signal having frequency properties corresponding to the inverse filter in a first frequency band not including a frequency with a gain of zero, and having frequency properties with amplitude thereof below a predetermined value in a second frequency band including a frequency with a gain of zero;

converting the second signal into an output filter; and filtering the access element by applying the output filter to the access element, wherein a frequency property of the low-pass filter contains at least one frequency with a gain of zero, and wherein the inverse filter is frequency component of the access element has a gain of zero.

6. The image processing method according to claim 5, wherein the predetermined value corresponds to the value of the inverse filter.

7. The image processing method according to one of claim 5 or 6, further comprising:

generating an inverse signal in which the first and second frequency bands of the inverse signal correspond to the inverse filter, based on the first signal;

computing the square of the first signal and outputting the result as a first intermediate signal;

subtracting the first intermediate signal from the first signal and outputting the result as a second intermediate signal;

adding the second intermediate signal to the first signal and outputting the result as an adjusted signal; and generating and outputting the second signal, the second signal having frequency properties of the inverse signal in the first frequency band not including a frequency with a gain of zero, and having frequency properties of the adjusted signal in the second frequency band including zero.

8. The image processing method according to claim 5, wherein the parameter values describing the properties of the imaging blur are respective moving vectors in at least one pixel of the pixels making up the access element, for each of a plurality of access elements making up the moving images.

9. A non-transitory computer readable medium having stored thereon a program that, when executed, causes a computer to process a moving image shot by a predetermined video shooting device, in increments of the moving image, the program comprising the steps of:

correcting at least one access element to be processed by changing properties of a low-pass filter indicating an imaging blur according to parameter values describing properties of the imaging blur occurring at a time that the moving image is shot by the video shooting device, generating an inverse filter having properties corresponding to an inverse transfer function of the low-pass filter, and processing the at least one access element by applying the inverse filter as to the access element;

converting the properties of the low-pass filter into properties according to one or more parameter values detected by a detector, and outputting a spatial region signal;

converting the low-pass filter generated as a spatial region signal into a first signal of a frequency region;

generating, based on the first signal, a second signal, the second signal having frequency properties corresponding to the inverse filter in a first frequency band not including a frequency with a gain of zero, and having frequency properties with amplitude thereof below a predetermined value in a second frequency band including a frequency with a gain of zero;

converting the second signal into an output filter; and filtering the access element by applying the output filter to the access element, wherein a frequency property of the low-pass filter contains at least one frequency with a gain of zero, and wherein the inverse filter is not applied when a frequency component of the access element has a gain of zero.

10. The computer readable medium according to claim 9, wherein the predetermined value corresponds to the value of the inverse filter.

11. The computer readable medium according to one of claim 9 or 10, further comprising:

generating an inverse signal in which the first and second frequency bands of the inverse signal correspond to the inverse filter, based on the first signal;

computing the square of the first signal and outputting the result as a first intermediate signal;

subtracting the first intermediate signal from the first signal and outputting the result as a second intermediate signal;

adding the second intermediate signal to the first signal and outputting the result as an adjusted signal; and generating and outputting the second signal, the second signal having frequency properties of the inverse signal in the first frequency band not including a frequency with a gain of zero, and having frequency properties of the adjusted signal in the second frequency band including a frequency with a gain of zero.

12. The computer readable medium according to claim 9, wherein the parameter values describing the properties of the imaging blur are respective moving vectors in at least one pixel of the pixels making up the access element, for each of a plurality of access elements making up the moving images.

13. An image processing device configured to process a moving image shot by a video shooting device in increments of the moving image comprising:

a processor; and a correcting unit comprising:

a low-pass filter property converting unit that converts the properties of the lowpass filter into properties according to one or more parameter values detected by a detecting unit, and outputs a spatial region signal;

a frequency converting unit that converts the low-pass filter generated as a spatial region signal into a first signal of a frequency region with the low-pass filter property converting unit;

a signal generating unit configured to generate, based on the first signal, a second signal, the second signal having frequency properties corresponding to the inverse filter in a first frequency band not including a frequency with a gain of zero, and having frequency properties with amplitude thereof below a predetermined value in a second frequency band including a frequency with a gain of zero;

a frequency inverse conversion unit that converts the second signal into an output filter; and a filtering unit that corrects the access element by applying the output filter to the access element, the correcting unit correcting at least one access element by changing properties of a low-pass filter indicating an imaging blur according to parameter values describing properties of the imaging blur occurring at a time that the moving image is shot by the video shooting device, generating an inverse filter having properties corresponding to an inverse transfer function of the low-pass filter, and processing the at least one access element by applying the inverse filter to the access element;

wherein a frequency property of the low-pass filter contains at least one frequency with a gain of zero, and wherein the inverse filter is not applied when a frequency component of the access element has a gain of zero.

14. The image processing device according to claim 13, wherein the predetermined value corresponds to the value of the inverse filter.

15. The image processing device according to one of claims 13 or 14, the signal generating unit further comprising:

an inverse signal generating unit configured to generate an inverse signal in which the first and second frequency bands of the inverse signal correspond to the inverse filter, based on the first signal;

a multiplying unit configured to compute the square of the first signal and output the result as a first intermediate signal;

a subtracting unit configured to subtract the first intermediate signal from the first signal and output the result as a second intermediate signal;

an adding unit configured to add the second intermediate signal to the first signal and output the result as an adjusted signal; and an adjusting unit configured to generate and output the second signal, the second signal having frequency properties of the inverse signal generated by the inverse signal generating unit in the first frequency band not including a frequency with a gain of zero, and having frequency properties of the adjusted signal output from the adding unit in the second frequency band including a frequency with a gain of zero.

16. The image processing device according to claim 13, wherein the parameter values describing the properties of the imaging blur are respective moving vectors in at least one pixel of the pixels making up the access element, for each of a plurality of access elements making up the moving images.

* * * * *